A discharge port 4 for discharging air into water is provided on the bottom of a craft behind the rear end of a strip 3 which is installed on the bottom of a small planing watercraft to protrude therefrom and extend in the longitudinal direction of the craft body. A pressure drop in a space behind the rear end of the strip 3 is used to suck in air outside of the craft and guide it through a discharge duct 5 to the discharge port 4, thereby decreasing the pressure resistance and friction resistance generated at the back of the strip 3 rear end. Ram pressure during running of the craft may also be used to take in air from the outside of the craft and guide it through the discharge duct 5 to the discharge port 4, thereby to discharge air from the discharge port 4 into water. The maximum craft speed and the craft acceleration performance is improved by sufficiently decreasing friction resistance at the back of strip rear end.

United States Patent [19]

Oshima

[11] Patent Number: 5,787,829
[45] Date of Patent: Aug. 4, 1998

[54] APPARATUS AND METHOD FOR SUPPRESSING DRAG FOR SMALL PLANING WATERCRAFT

[75] Inventor: Takeru Oshima, Akashi, Japan

[73] Assignee: Kawasaki Jukogyo Kabushiki Kaisha, Kyogo, Japan

[21] Appl. No.: 707,702

[22] Filed: Sep. 4, 1996

[30] Foreign Application Priority Data

| Sep. 5, 1995 | [JP] | Japan | 7-254746 |
| Sep. 20, 1995 | [JP] | Japan | 7-267906 |
| Sep. 20, 1995 | [JP] | Japan | 7-267907 |
| Sep. 20, 1995 | [JP] | Japan | 7-267908 |

[51] Int. Cl.$^6$ ............................. B63B 1/38
[52] U.S. Cl. ........................ 114/67 A; 114/289
[58] Field of Search ............... 114/67 A, 289; 440/66, 49, 6, 83

[56] References Cited

U.S. PATENT DOCUMENTS

| 1,007,811 | 11/1911 | Somers | 440/40 |
| 1,157,423 | 10/1915 | Ryan et al. | 114/67 A |
| 1,217,828 | 2/1917 | Ruhe | 114/289 |
| 1,784,071 | 12/1930 | Norman | 114/67 A |
| 1,795,596 | 3/1931 | Fleming et al. | 114/289 |
| 1,824,313 | 9/1931 | Vogler | 114/67 A |
| 1,831,697 | 11/1931 | Ziegler | 114/67 A |
| 3,316,874 | 5/1967 | Canazzi | 114/289 |
| 4,165,703 | 8/1979 | Burg | 114/289 |
| 4,231,314 | 11/1980 | Peters | 114/289 |
| 4,548,586 | 10/1985 | Phillips, Jr. | 440/6 |
| 4,747,796 | 5/1988 | Iwai et al. | 440/83 |

FOREIGN PATENT DOCUMENTS

| 394925 | 5/1909 | France | 114/289 |
| 61-57477 A | 3/1986 | Japan . | |
| HEI 2-99083 | 7/1990 | Japan . | |
| HEI 3-19796 | 2/1991 | Japan . | |
| 403243489 | 10/1991 | Japan | 114/67 A |
| 6-312684 A | 8/1994 | Japan . | |
| HEI 9-505253 | 5/1997 | Japan . | |
| 2018205 | 10/1979 | United Kingdom | 114/289 |

Primary Examiner—Sherman Basinger
Attorney, Agent, or Firm—Marshall, O'Toole, Gerstein, Murray & Borun

[57] ABSTRACT

31 Claims, 28 Drawing Sheets

APPARATUS AND METHOD FOR SUPPRESSING DRAG FOR SMALL PLANING WATERCRAFT

TECHNICAL FIELD OF THE INVENTION

The present invention relates to a drag suppressing apparatus and a drag suppressing method for a small planing watercraft which are capable of increasing the maximum craft speed or improving the acceleration performance, by reducing the pressure resistance caused by a pressure decrease on the bottom of the watercraft or reducing the friction resistance between the bottom of the craft and the outside water stream.

BACKGROUND OF THE INVENTION

In small planing watercraft such as motor boats and personal watercraft, a spray strip (hereinafter called strip) is formed on the bottom of the craft protruding therefrom and extending along the longitudinal direction of the craft body (refer to Japanese Patent Unexamined Publication No. 61-57477). While a rear end position of the strip is determined from the desired craft posture during running, when the optimum position of the rear end position is located more forward than the stern, a region of decreased pressure is generated at the bottom of the craft behind the rear end of the strip, thereby generating a pressure resistance during running.

Possible attempts to decrease the pressure resistance include such measures as the strip is extended from the optimum rear end position aftward with the cross sectional area thereof being reduced.

As disclosed in Japanese Patent Unexamined Publication No. 6-312684, such method is also known as a stern bottom board which covers the lower part of a water-jet propulsor is located higher than the bottom board located forward thereof, thereby making a step, while air surrounding the water-jet propulsor above the stern bottom board is taken into a negative pressure region at the back of the step and is discharged, thereby suppressing the pressure resistance from increasing due to the negative pressure region. Also such method as air is introduced into the bottom of the craft has been disclosed in Japanese Utility Model Unexamined Publication No. 3-19796.

However, in such a configuration, as the tail of the strip is extended aftward with the cross sectional area thereof being reduced, the extended portion increases the friction resistance, resulting in a negative, decreased effect of increasing the maximum craft speed and improving the acceleration performance.

In the conventional configuration of discharging air into the step, the location of discharging air is limited to the step made in the planing surface, and therefore it is difficult to apply such a technique to planing craft which do not have a step on the bottom of the craft. Further, no prior disclosure has been made with regards to sealing of the discharging portion against water when air in the craft body is discharged through the bottom of the craft, which is a different problem from the air in the space around a water-jet propulsor located outside the craft body.

In such a configuration by simply introducing air into the bottom of the craft, on the other hand, friction resistance on the bottom of the craft is decreased by the discharged air particularly during a craft turning maneuver, and therefore the craft is likely to experience sideways skidding.

The present invention is intended to solve the problems described above, and has an object of providing a drag suppressing apparatus and a drag suppressing method for small planing watercraft which are capable of increasing the maximum craft speed or improving the acceleration performance, by reducing the pressure resistance caused by a pressure decrease on the bottom of the craft or reducing the friction resistance between the bottom of the craft and the outside water stream.

Another object of the invention is to provide a drag suppressing apparatus and a drag suppressing method which are capable of suppressing sideways skidding of the craft during a craft turning maneuver.

SUMMARY OF THE INVENTION

In order to achieve the objects described above, a drag suppressing apparatus for a small planing watercraft according to one embodiment of the invention is provided with a strip installed on the bottom of the craft protruding therefrom and extending along the longitudinal direction of the craft body, a discharge port installed on the bottom of the craft behind the rear end of the strip to discharge air into water and a discharge duct for taking in air from the outside of the craft body and directing the air to the discharge port by using a pressure decrease in a space behind the rear end of the strip.

With this embodiment, air outside of the craft body is sucked in by a pressure decrease generated in a space behind the rear end of the strip on the bottom of craft during running, and is discharged into the water from the discharge port located behind the rear end of the strip through the discharge duct, and therefore pressure resistance behind the rear end of the strip decreases and friction resistance of the outside water stream acting onto the bottom of craft is also reduced by the sucked air which wedges in between the bottom of the craft and the outside water stream.

A drag suppressing apparatus for a small planing watercraft according to another embodiment of this invention sucks in air from an engine room and directs it to the discharge port instead of sucking in air from the outside of the craft body by means of the discharge duct, in the apparatus described above.

With this configuration, air in the engine room is sucked in by a pressure decrease generated in a space behind the rear end of the strip on the bottom of craft during running, and is discharged into water from the discharge port located behind the rear end of the strip through the discharge duct, and therefore pressure resistance and friction resistance on the bottom of the craft are decreased while the engine room is ventilated.

In a preferred embodiment of this invention, the discharge port is displaced from the center line of the bottom of the craft to one side, and the discharge duct has an intake port located at a position displaced from the center line in the engine room to another side.

With this configuration, even when the craft is tipped so that the intake port of one discharge duct is below the water line, the discharge port thereof opens above the water line and therefore water does not enter from the discharge port through the discharge duct into the engine room. While the discharge port of another discharge duct immerses below the water line, the intake port thereof opens above the water line and therefore water in the discharge duct does not enter from the intake port into the engine room.

In another preferred embodiment of the invention, the discharge port opens substantially, e.g. just backward or obliquely backward from the bottom of the craft.

With this configuration, because air is discharged backward or obliquely backward from the discharge port, undesirable rising of the stern does not occur and a desirable running posture for the craft can be maintained.

The configuration of discharging air backward or obliquely backward from the discharge port can be achieved, for example, by providing a guide-out port which is installed on the bottom of craft and directs the air to the outside of the bottom wall of the craft and a cover which directs the air from the guide-out port to a rear-end aperture that forms the discharge port.

With this configuration, air can be discharged backward or obliquely backward from the discharge port in an easily constructed structure. Also by removing the cover, troubles such as clogging of the discharge port with sand can be easily removed, and the cover can be freely changed according to the cross sectional shape of the strip.

Further, in the configuration having the guide-out port and the cover, it is preferable that an aperture is formed in the bottom of the craft wall and a guide-out duct is installed to extend through the aperture upward above the water line during the time when the craft is at standstill and forms the guide-out port at the bottom end thereof.

With this configuration, because the top end of the guide-out duct remains above the water line when the craft is at standstill, water does not enter through the guide-out duct into the craft.

In further another embodiment of the invention, a part of the discharge duct is disposed in a space between the bottom wall of the craft and an inner wall member located to oppose the inner surface of the bottom wall of the craft.

With this configuration, because a part of the discharge duct can be arranged to be not exposed inside the craft body, the inner space of the craft body can be efficiently utilized.

A drag suppressing method for a small planing watercraft according to one embodiment of the invention is to form a strip installed on the bottom of the craft protruding therefrom and extending along the longitudinal direction of the craft body, and air which is sucked in from the outside of the craft body by using a pressure decrease in a space behind the rear end of the strip, is discharged into the space.

With this configuration, because air is sucked in from the outside of the craft body by using a pressure decrease in a space behind the rear end of the strip and discharged into the space behind the rear end of the strip, a pressure decrease generated behind the rear end of the strip is suppressed and friction resistance of the outer water stream acting onto the bottom of the craft is also reduced by the sucked air wedging in between the bottom of the craft and the outside water stream.

A drag suppressing method for small planing watercraft according to another embodiment of the invention is to suck air from inside of the engine room, instead of sucking air from the outside of the craft body, and discharging the air into the space behind the rear end of the strip, in the drag suppressing method described above.

With this configuration, air in the engine room is sucked by a pressure decrease generated behind the rear end of the strip on the bottom of craft during running, and is discharged into water from the discharge port located behind the rear end of the strip, and therefore pressure resistance on the bottom of craft is decreased while the engine room is ventilated.

In order to achieve the objects described above, a drag suppressing apparatus for a small planing watercraft according to an embodiment of the invention is provided with a discharge port installed on the bottom of the craft, in a region which forms a water-contact surface to discharge air into water, and a discharge duct for taking in air from the outside of the craft body and directing the air to the discharge port by using ram pressure during running of the craft.

With this configuration, because air outside of the craft is taken into the discharge duct and discharged into water from the discharge port located on the bottom of the craft by the ram pressure during running of the craft, friction resistance on the bottom of the craft is reduced by the discharged air forming a layer between the bottom of craft and the outside water stream.

A drag suppressing apparatus for a small planing watercraft according to another embodiment of the invention is provided with a discharge port installed on the bottom of the craft, in a region forming a water-contact surface, for discharging air into the water, a ram air duct for taking in air from the outside of the craft body and introducing it into an engine room by using ram pressure during running of the craft, and a discharge duct for sucking air from the engine room and directing it to the discharge port.

With this configuration, air is taken in from the outside of the craft body through the ram air duct into the engine room by the ram pressure during running of the craft, and the air in the engine room is further passed through the discharge duct and discharged from the discharge port located at the bottom of craft, and therefore a layer of discharged air is formed between the bottom of the craft and the outside water stream, thereby reducing the friction resistance on the bottom of craft and ventilating the engine room.

A drag suppressing apparatus according to another embodiment of the invention is provided with a discharge port installed on the bottom of the craft, in a region which forms a water contact surface, for discharging air into water, a pump for sucking in air from the engine room or outside of the craft body and a discharge duct for directing the air delivered by the pump to the discharge port.

With this configuration, air is taken from the engine room or outside of the craft body by means of the pump and, after passing through the discharge duct, discharged into the water from the discharge port located at the bottom of the craft, and therefore a layer of discharged air is formed between the bottom of the craft and the outside water stream, thereby reducing the friction resistance on the bottom of craft. When the air in the engine room is discharged, ventilation of the engine room is accomplished.

A drag suppressing apparatus according to another embodiment of the invention is provided with a discharge port installed on the bottom of the craft, in a region which forms a water-contact surface, for discharging air into the water, and a discharge duct which directs at least a part of exhaust gas from the engine to the discharge port.

With this configuration, because at least a part of the exhaust gas from the engine is passed through the discharge duct and discharged from the discharge port located at the bottom of the craft into water, the discharged exhaust gas separates the outside water stream from the bottom of the craft, thus greatly decreasing the friction resistance on the bottom of the craft.

In a preferred embodiment of the invention, the discharge port is displaced from the center line of the bottom of the craft to one side, and the discharge duct has an intake port located at a position displaced from the center line in the engine room to another side.

With this configuration, in case the craft is tipped so that the intake port of the discharge duct is below the water line, the discharge port thereof opens above the water line and, when the discharge port is immersed below the water line, on the other hand, the intake port of the discharge duct opens above the water line and therefore water does not enter from the discharge port through the discharge duct into the engine room.

In another preferred embodiment of the invention, the discharge port opens backward or obliquely backward from the bottom of the craft.

With this configuration, because air is discharged backward or obliquely backward from the discharge port, undesirable rising of the stern does not occur and a desirable running posture of the craft can be maintained.

In still another preferred embodiment of the invention, a part of the discharge duct which directs the air or the exhaust gas to the discharge port is disposed in a space between the bottom wall of the craft and an inner wall member located to oppose the inner surface of the bottom wall of the craft.

With this drag suppressing apparatus, because a part of the discharge duct can be arranged to be not exposed inside the craft, inner space of the craft can be efficiently used.

A drag suppressing method according to one embodiment of the invention is to install a discharge port on the bottom of the craft, in a region which forms a water-contact surface, for discharging air into water, thereby to take in air from the outside of the craft body and direct the air into the discharge port by using ram pressure during running of the craft.

With this configuration, because air outside of the craft body is taken in and discharged into the water from the discharged port located at the bottom of the craft by using the ram pressure during running of the craft, the friction resistance on the bottom of the craft is reduced by the discharged air forming a layer between the bottom of craft and the outside water stream.

A drag suppressing method according to another embodiment of the invention is to install a discharge port on the bottom of the craft, in a region which forms a water-contact surface, for discharging air into water, thereby to take in air from the outside of the craft and direct it into an engine room by using ram pressure during running of the craft, and suck in the air out of the engine room and direct it to the discharge port.

With this configuration, because air outside of the craft is taken into the engine room by using the ram pressure during running of the craft and the air in the engine room is discharged through the discharge port located at the bottom of the craft, friction resistance on the bottom of the craft is reduced and the engine room is ventilated.

Further, in order to achieve the objects described above, a drag suppressing apparatus for a small planing watercraft according to a third embodiment of the invention is provided with a guide-out duct which has an aperture opening in the bottom of the craft, in a region which forms a water-contact surface, said guide-out duct being integrally formed with the bottom wall of the craft and extending upward above the water line of the time when the craft is at standstill, and a cover which covers the aperture in the bottom of the craft and has a discharge port directed backward or obliquely backward on the bottom of the craft, whereby fluid is passed through the guide-out duct and discharged into water from the discharge port.

With this configuration, because the guide-out duct which constitutes a discharge path opens in the bottom of the craft and the aperture is covered by the cover having the discharge port, fluid such as air, exhaust gas and bilge water can be discharged from a desired position on the bottom of the craft even when the bottom of the craft is configured without a step. At the same time, pressure resistance can be reduced because the fluid is discharged into an area of decreased pressure on the bottom of the craft. Also because the guide-out duct is integrally formed with the bottom wall of the craft, the area around the discharge port is sealed against water. Further because the guide-out duct extends from the bottom of the craft upward above the water line of the time when the craft is at standstill (with crew on board), entry of water through the guide-out duct can be prevented during standstill as well as running.

In a drag suppressing apparatus for the small planing watercraft according to another embodiment of the invention, the intake port of the discharge duct is located in the engine room to discharge air from the engine room through the discharge duct and the guide-out duct into water from the discharged port.

With this configuration, the engine room can be ventilated because air in the engine room is discharged through the discharge duct and the guide-out duct into water from the discharge port.

In a drag suppressing apparatus for the small planing watercraft according to another embodiment of the invention, the craft body comprises a hull and a deck which is bonded with the hull, the guide-out duct is formed integrally with the hull, and an intake duct which is connected to the guide-out duct is installed on the deck to take in air from the outside of the craft body and introduce it into the guide-out duct.

With this configuration, air outside of the craft body is taken in smoothly by the intake duct and is discharged through the guide-out duct into water from the discharge port.

In a drag suppressing apparatus for small planing watercraft according to another embodiment of the invention, the cover is mounted detachably on the bottom wall of the craft.

With this configuration, troubles such as clogging of the discharge port with sand can be removed by removing the cover. And various craft bottom configurations can be freely accommodated by changing the cross sectional shape of the cover.

In a preferred embodiment of the invention, an upstream side edge of the discharge port of the cover in the outside water stream is located downward from the bottom of the craft wall so that a negative pressure region is formed in the discharge port as the outside water stream velocity increases the speed.

With this configuration, the discharge port itself has a function of sucking out fluid from the inside of the craft body and discharging it into water because of the negative pressure region formed at the discharge port by the action of the upstream side edge portion in the outside water stream, and therefore fluid such as air and bilge water in the craft can be discharged into water without using a pump or the like.

In another preferred embodiment of the invention, a downstream side edge of the discharge port of the cover in the outside water stream is displaced more upward than the upstream side edge of the discharge port in the outside water stream, so that a negative pressure region is formed as the outside water stream separates.

With this configuration, too, the discharge port itself has a function of sucking out fluid from the inside of the craft and discharging it into water because of the negative pressure region formed at the discharge port by the action of the downstream side edge portion in the outside water stream, and therefore fluid can be discharged into water without using a pump or the like.

Further, in order to achieve the objects described above, a drag suppressing apparatus for a small planing watercraft according to a fourth embodiment of the invention is provided with a discharge port which is installed on the bottom of the craft, in a region which forms a water-contact surface for discharging gas into water, a discharge duct for directing gas into the discharge port, a control valve for controlling the flow rate of the gas through the discharge duct and a valve driving means in linkage with a steering device for driving the control valve to decrease its opening as the amount of movement of a steering device increases.

With this configuration, because the gas taken into the discharge duct is discharged from the discharge port located at the bottom of the craft into water, a layer of discharge gas is formed between the bottom of the craft and the outside water stream, and therefore the friction resistance on the bottom of the craft is reduced. Also when turning the craft during which movement of the steering device increases, the valve driving means which is linked to the steering device decreases the opening of the control valve, and therefore a decrease in the friction resistance on the bottom of the craft due to the discharged gas is suppressed, thus making it possible to suppress the sideways skidding of the craft during a craft turning maneuver.

The valve driving means may be provided with a rotor rotatably linked to a support shaft of the control valve via a torsion spring and transmission means which drives the rotor to rotate in linkage with the steering device.

In this configuration, movement of the steering device is transmitted via the transmission means, the rotor and the torsion spring to the support shaft of the control valve, thereby decreasing the opening of the control valve. Even when the amount of movement of the steering device exceeds an amount corresponding to full closing of the control valve, movement of the steering device beyond said movement amount is corresponding to full closing absorbed by the torsion spring, and therefore the control valve can be fully closed by swinging the steering device only slightly.

A drag suppressing apparatus for the small planing watercraft according to another embodiment of the invention is provided with a discharge port installed on the bottom of the craft, in a region which forms a water-contact surface, for discharging gas into water, a discharge duct for directing the gas into the discharge port, a control valve for controlling the flow rate of the gas through the discharge duct and a control means for regulating the opening the control valve.

With this configuration, too, the gas taken into the discharge duct and discharged into water from the discharge port located at the bottom of the craft reduces the friction resistance at the bottom of the craft. When the craft is turning, decrease in the friction resistance on the bottom of the craft due to the discharged gas can be suppressed by adjusting the control valve by means of the control means so that the opening thereof decreases, and therefore it is made possible to suppress the sideways skidding of the craft during a craft turning maneuver.

The control means may also be provided with a valve control lever which is manually operated and a link mechanism which links to the valve control lever to regulate the opening of the control valve. With this configuration, sideways skidding when the craft is turning can be suppressed by manually operating the valve control lever to decrease the opening of the control valve.

The control means may also be provided with a valve control switch which is manually operated and electrically operated valve driving means which is actuated by controlling the energization thereof by means of the valve control switch thereby to regulate the opening of the control valve. With this configuration, sideways skidding when the craft is turning can be suppressed by manually operating the valve control switch to control the energization of the valve driving means to actuate, and thereby decreasing the opening of the control valve.

A drag suppressing method for the small planing watercraft according to another embodiment of the invention is to install a discharge port on the bottom of the craft, in a region which forms a water-contact surface, for discharging gas from the discharge port into water, wherein the quantity of discharged gas is controlled to decrease as the amount of movement of the steering device increases.

With this configuration, because the gas discharged into water from the discharge port located at the bottom of the craft reduces the friction resistance at the bottom of the craft and, when the craft is turning during which the movement of the steering device increases, the quantity of the discharged gas is decreased and therefore a decrease in the friction resistance on the bottom of the craft is suppressed, thus making it possible to suppress the sideways skidding of the craft.

A drag suppressing method for the small planing watercraft according to another embodiment of the invention is to install a discharge port on the bottom of the craft, in a region which forms a water-contact surface, for discharging gas from the discharge port into water, wherein the quantity of discharged gas is controlled by manual operation.

With this configuration, the gas discharged into water from the discharge port located at the bottom of the craft reduces the friction resistance at the bottom of the craft and, when the craft is turning, the quantity of the discharged gas is decreased by manual operation thereby suppressing the decrease in the friction resistance on the bottom of the craft, thus making it possible to suppress the sideways skidding of the craft.

In the drag suppressing apparatuses and the drag suppressing methods of each of the embodiments described above, air or exhaust gas from a craft propelling engine can be used as the gas.

DETAILED DESCRIPTION

Preferred embodiments of the invention will be described below with reference to the accompanying drawings.

Figure 1:
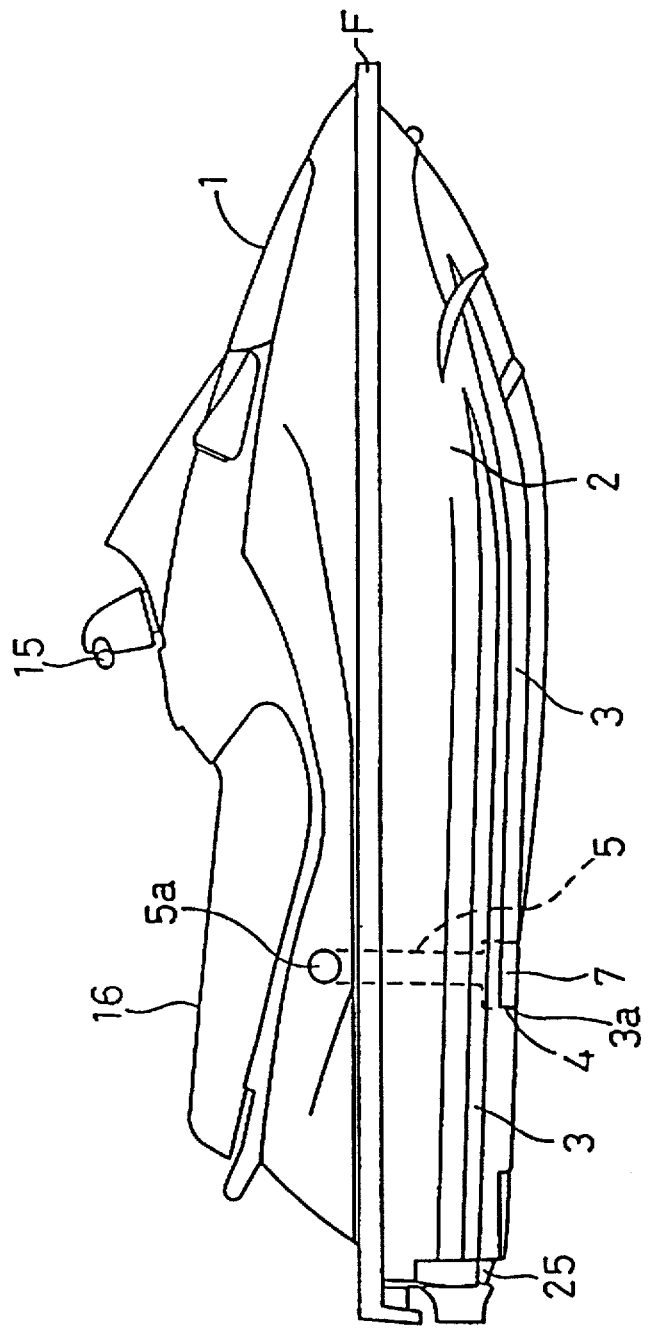
FIG. 1 is a side view of a small planing watercraft provided with a drag suppressing apparatus according to the first embodiment of the invention.
Figure 2:
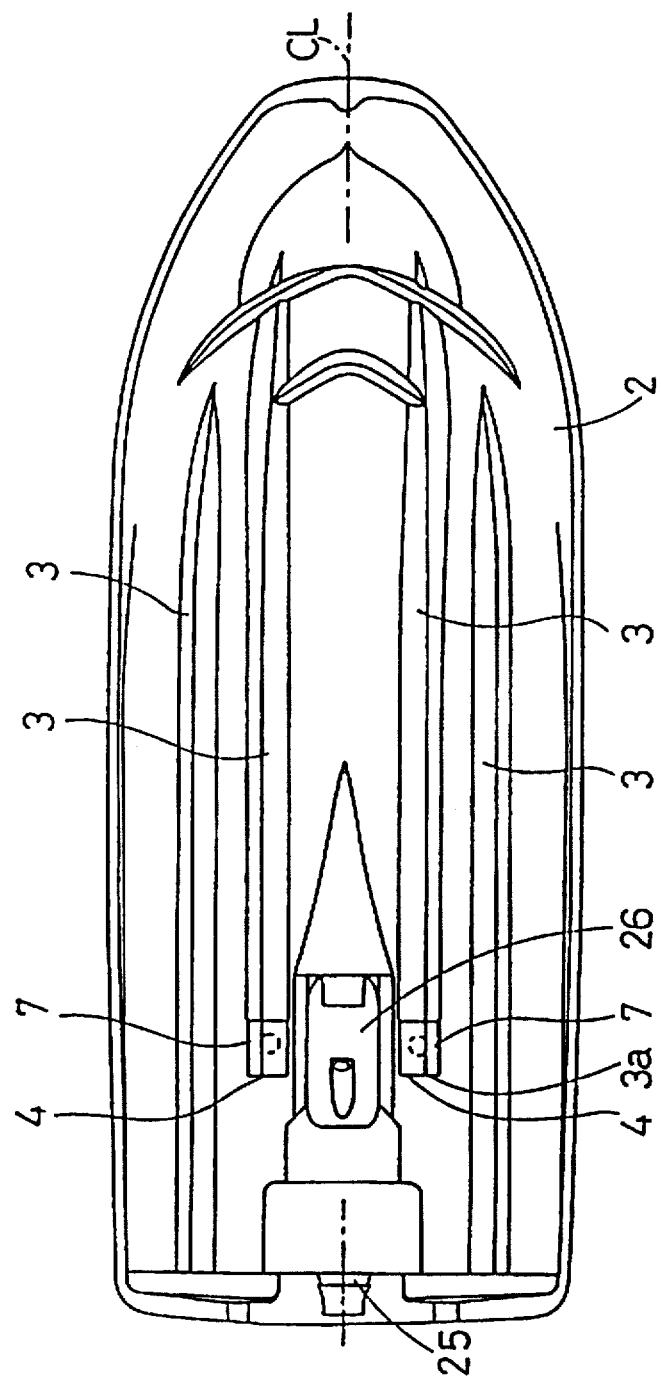
FIG. 2 is a bottom view of the small planing watercraft.
Figure 3:
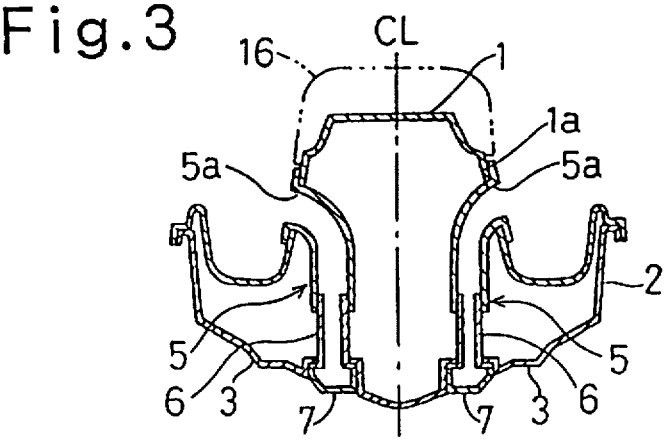
FIG. 3 is a cross sectional view of the small planing watercraft.

FIG. 1 shows a side view of a small planing watercraft provided with a drag suppressing apparatus which is the first embodiment of the invention. The craft body of the small planing watercraft is formed by bonding a deck 1 in the upper portion and a hull 2 in the lower portion by mating the flanges F thereof. A water jet propulsor 25 is installed on the bottom of the craft at the stern to be driven by an engine, which is installed in the craft but not shown in the drawing, thereby to propel the craft body. Formed on the bottom of the craft are a plurality of strips 3 protruding therefrom and extending along the longitudinal direction of the craft body as shown in the bottom view of FIG. 2. On the bottom of the craft body at the backward position near the rear end 3a where a step is made in the strip 3 located near the center among the strips 3, a discharge port 4 is provided for discharging air into water. The rear ends 3a are located at the right and left sides of a water intake port 26 provided on the bottom of the craft for the water jet propulsor. In the craft body, a discharge duct 5 is installed for sucking in air from the outside of the craft body through an intake port 5a which opens on a side face of a seat base 1a of the deck 1 and directs the air into the discharge port 4, for example, as shown in cross sectional view of FIG. 3.

Figure 4A:
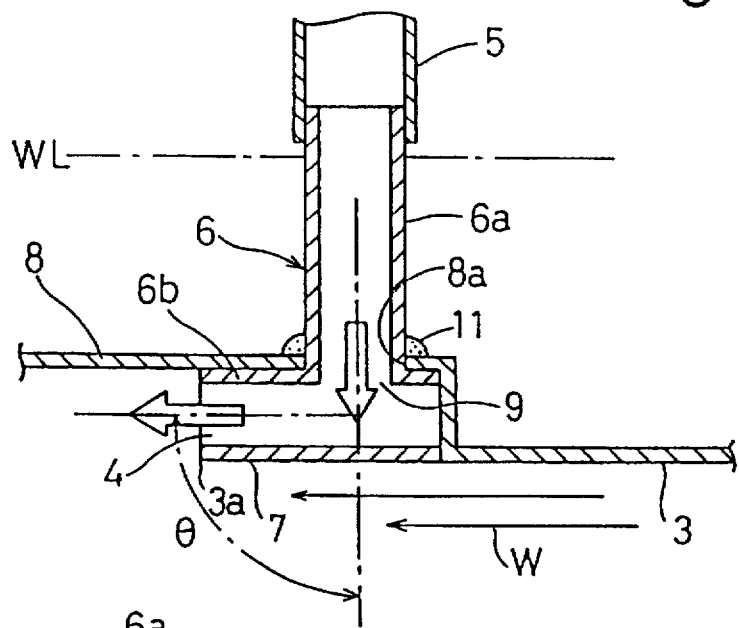
FIG. 4(A) is a longitudinal sectional view of the water discharge port portion of the small planing watercraft.
Figure 4B:
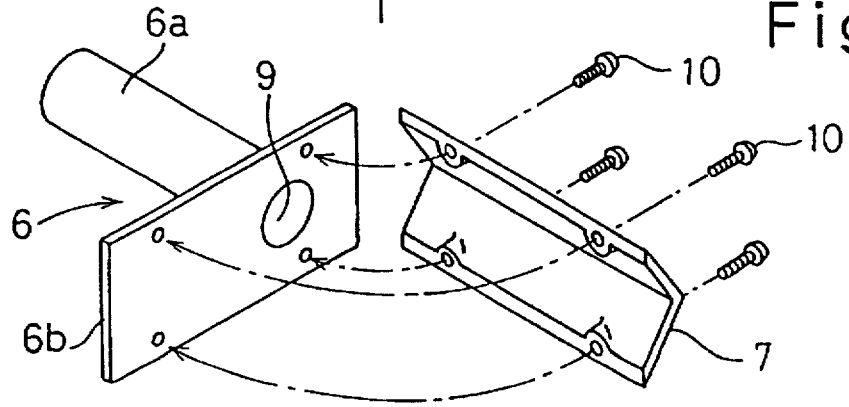
FIG. 4(B) is a perspective exploded view of the water discharge port portion.

A discharge path from the bottom end of the discharge duct 5 to the discharge port 4 comprises a guide-out duct 6 and a cover 7 as shown in FIG. 4(A). That is, the guide-out duct 6 has a duct portion 6a which penetrates an aperture 8a formed in the bottom of the craft wall 8 and a mounting plate 6b which makes contact with the outer surface of the bottom of the craft wall 8, while the mounting plate 6b has a guide-out port 9 installed thereon where the bottom end of the duct portion 6a opens. The cover 7 is made to have the same cross sectional shape as that of the strip 3 and forms the rear end 3a of the strip 3. The cover 7 is mounted detachably on the bottom of the craft by screwing bolt-like fixtures 10, which are inserted through the cover 7 and the mounting plate 6b of the guide-out duct 6, into nuts fixed on the inside of the bottom of the craft wall 8 which is not shown in the drawing, as shown in FIG. 4(B).

With this configuration, air guided from the guide-out port 9 of the guide-out duct 6 downward at right angles to the bottom of the craft is deflected by the cover from downward to backward (deflection angle θ=90°), and is discharged from the rear end aperture of the cover 7 which serves as the discharge port 4. The guide-out duct 6 is extended above the water line WL during the time when the craft is standstill, so that water does not enter in the craft through the joint thereof with the discharge duct 5. The duct portion 6a of the guide-out duct 6 which penetrates the aperture 8a in the bottom of the craft wall 8 is bonded to the aperture 8a with an adhesive 11 which also serves as seal against liquid.

Figure 5:
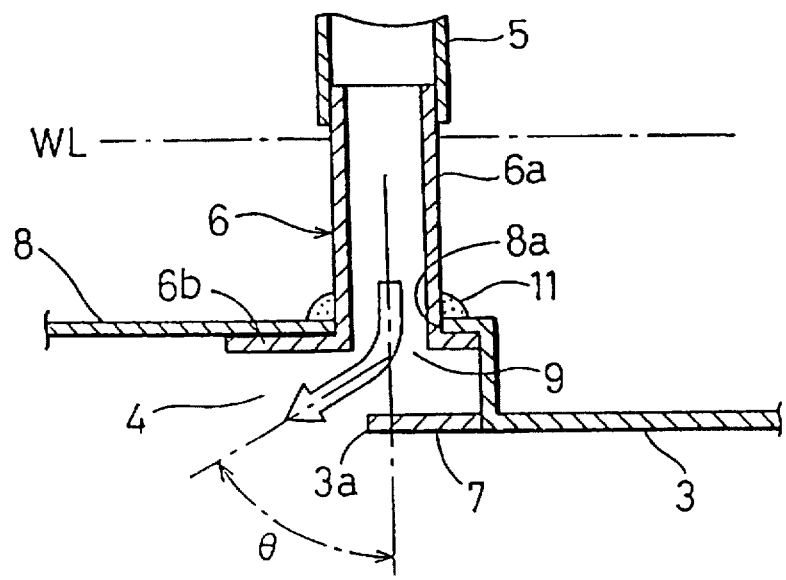
FIG. 5 is a longitudinal sectional view showing another example of the water discharge port portion of the small planing watercraft.

FIG. 5 shows another example where the discharge path from the bottom end of the discharge duct 5 to the discharge port 4 is constituted from the guide-out duct 6 and the cover 7. In this example, the cover 7 is made shorter than the mounting plate 6b of the guide-out duct 6 and the discharge port 4 opens to a direction obliquely backward with a deflection angle θ of 60° or greater from the direction perpendicular to the bottom of the craft.

In the case of the small planing watercraft of the above configuration, air outside of the craft body is sucked in through the discharge duct 5 because of the pressure decrease in a space behind the rear end of the strip 3 during running, and is discharged backward or obliquely backward from the discharge port 4 located at the bottom of the craft behind the rear end of the strip 3, with the discharged air being capable of suppressing the generation of pressure resistance due to a decrease in the pressure caused by the separation of outside water stream W (FIG. 4) from the bottom of the craft in a space behind the rear end of the strip 3. Further, air discharged from the discharge port 4 wedges in between the bottom of the craft and the outside water stream W, thereby reducing the friction resistance of the outside water stream W acting on the bottom of the craft. Thus it is made possible to increase the maximum craft speed and improve the acceleration performance.

Because the air region generated on the bottom of craft automatically deforms according to the craft speed, posture and turning maneuver, the air region can be maintained in an ideal shape. Thus it is made possible to determine the position of the strip rear end freely for the desirable posture of the planing watercraft, without fearing an increase in the friction resistance due to the outside water stream W.

Further, because the discharge port 4 opens substantially backward, e.g. just backward or obliquely backward from the bottom of the craft, air is discharged backward or obliquely backward from the discharge port 4 so that a desirable running posture for the watercraft is maintained without undesirable rising of the stern. The deflection angle θ of the discharged air from the direction perpendicular to the bottom of the craft is preferably in a range from about 60° up to about 120°. A deflection angle greater than about 120° is not desirable because it makes it difficult to discharge air smoothly from the discharge port 4 backward. A deflection angle below about 60° is not desirable because it increases the influence on the craft posture during running.

This configuration is also made in a simple structure, because the path of discharging air backward or obliquely backward from the discharge port 4 is formed with the guide-out port 9 installed on the bottom of the craft and the cover 7 which directs air from the guide-out port 9 to the rear end aperture that forms the discharge port 4. Moreover, because the cover 7 is installed detachably on the bottom of the craft, troubles such as clogging of the discharge port 4 with sand can be easily removed by removing the cover 7, and the cover 7 can be freely changed according to the cross sectional shape of the strip 3.

Figure 6:
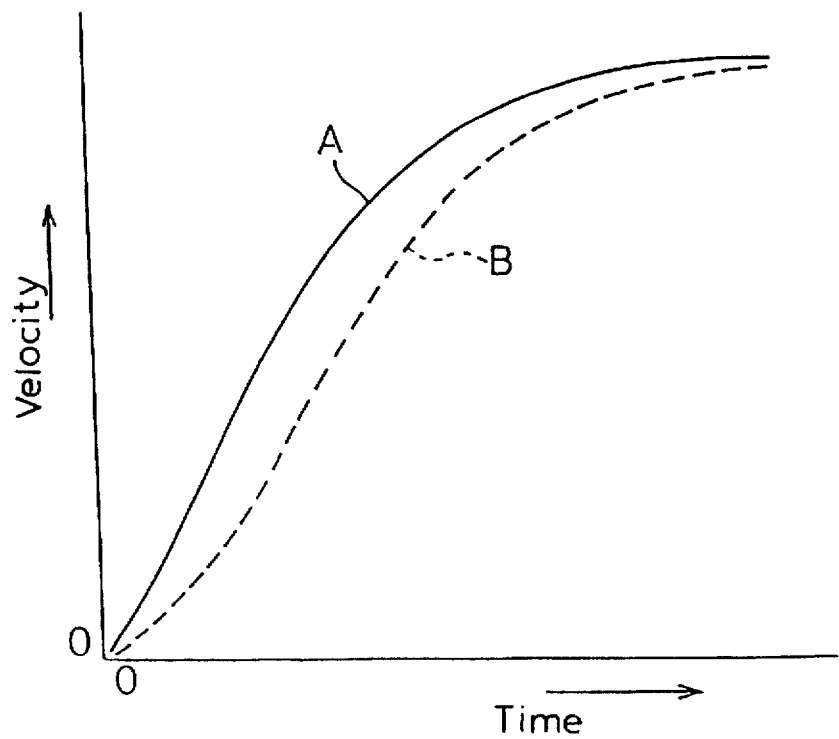
FIG. 6 is a graph showing acceleration performance of the small planing watercraft in comparison with the prior art.

FIG. 6 shows acceleration characteristics of the small planing watercraft of the invention and a small planing watercraft of the prior art. In this drawing, graph A drawn with the solid line shows the acceleration characteristic of the small planing watercraft of the embodiment described above, and graph B drawn with the dashed line shows the acceleration characteristic of the small planing watercraft of the prior art. As will be clear from this drawing, the small planing watercraft of the embodiment has better acceleration characteristic than the small planing watercraft of the prior art due to the effect of the drag suppression apparatus and also has increased maximum craft speed.

Figure 7:
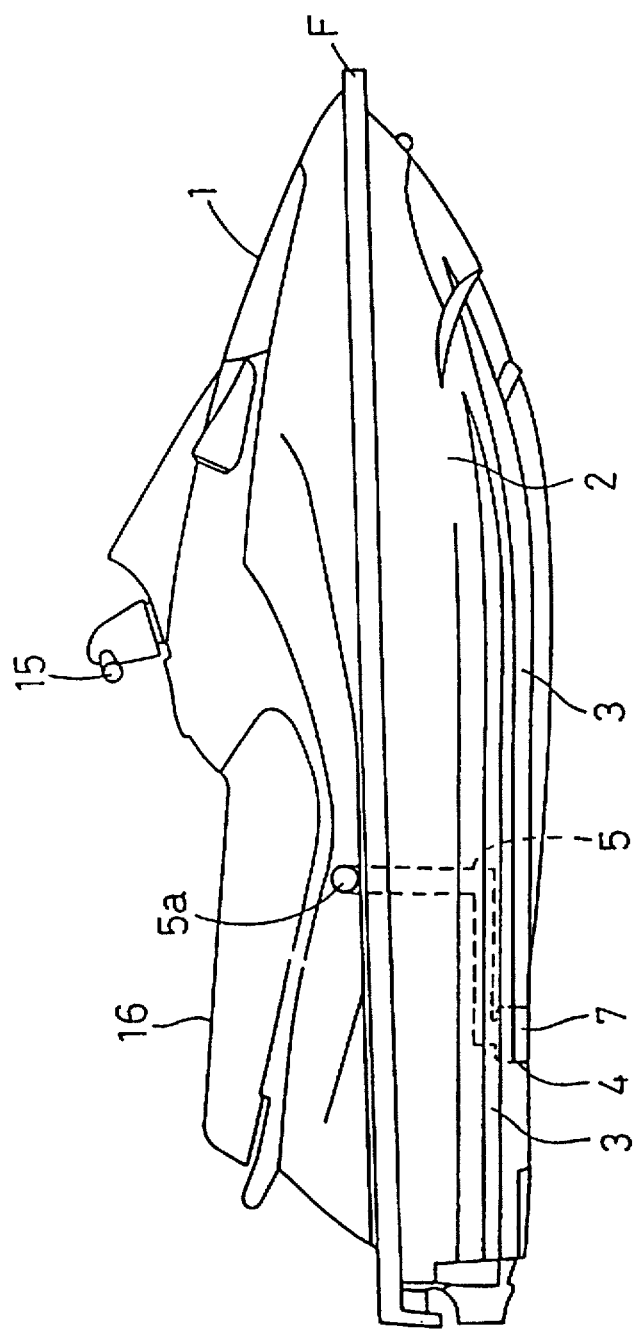
FIG. 7 is a side view of a small planing watercraft provided with a drag suppressing apparatus according to the second embodiment of the invention.
Figure 8:
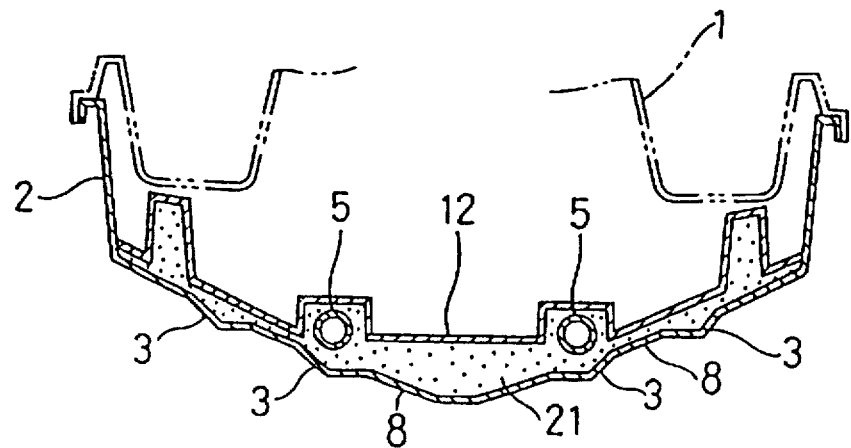
FIG. 8 is a cross sectional view showing an example of piping for the water discharge duct in the small planing watercraft.

FIG. 7 shows a second embodiment of the invention. In this drawing, the intake port 5a is located more forward in the craft body than the discharge port 4, both being connected with the discharge duct 5. The rear half of the discharge duct 5 extends along the bottom of the craft. As shown in FIG. 8, the hull 2 has a double-bottom structure made by joining the bottom wall 8 of the craft made of a fiber-reinforced plastic and an inner wall member 12 which is also made of a fiber-reinforced plastic and is disposed to oppose the inner surface of the bottom wall 8 of the craft. The rear half of the discharge duct 5 is disposed in the space between the bottom wall 8 of the craft and the inner wall member 12. The rest of the space between the bottom of the craft wall 8 and the inner wall member 12 is filled with a foamed substance 21. This configuration makes it possible to prevent the effective space in the craft from being decreased by piping of the discharge duct 5.

Figure 9:
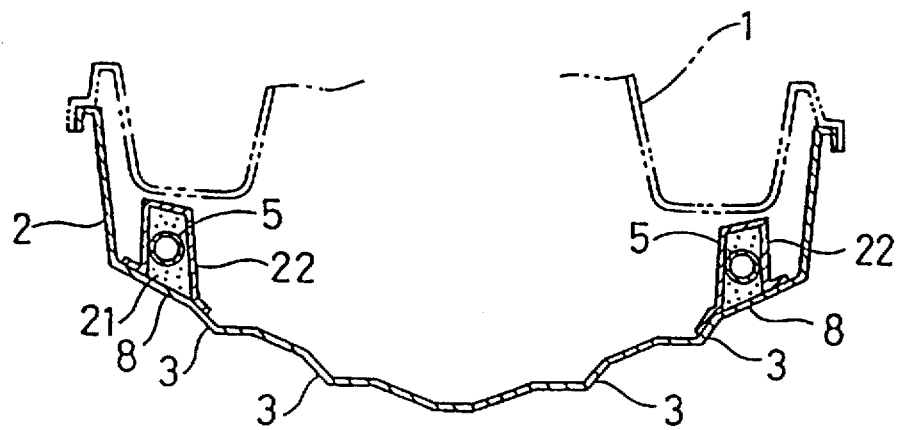
FIG. 9 is a cross sectional view showing another example of piping for the water discharge duct in the small planing watercraft.

FIG. 9 shows a cross sectional view of the craft body wherein the hull 2 is made by joining reinforcement ribs 22 which are made of fiber-reinforced plastic in a trapezoidal cross section onto the inner surface of the bottom wall 8 of the craft as the inner wall members. In this configuration, a part of the discharge duct 5 is disposed in the space between the bottom wall 8 of the craft and the reinforcement ribs 22. The rest of the space is filled with the foamed substance 21. This configuration also makes it possible to prevent the effective space in the craft from being decreased by piping of the discharge duct 5.

Figure 10:
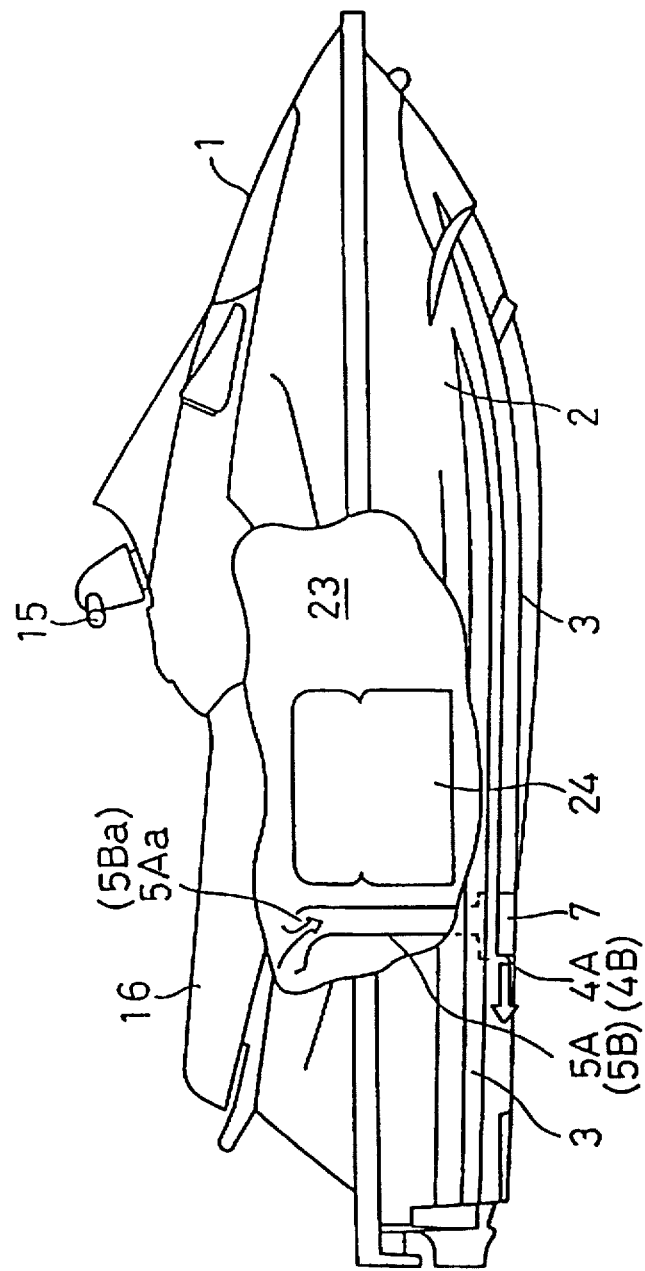
FIG. 10 is a side view of a small planing watercraft provided with a drag suppressing apparatus according to the third embodiment of the invention.

FIG. 10 shows a side view of a small planing watercraft provided with a drag suppressing apparatus as a third embodiment of the invention. In this embodiment, A pair of right and left discharge ports 4A, 4B for discharging air into water are installed on the bottom of the craft body at the backward positions near the rear end of the strips 3. Discharge ducts 5A, 5B are installed in the engine room 23 so that air in the engine room 23 is guided by the discharge ducts 5A, 5B to the corresponding discharge ports 4A, 4B. The discharge ports 4A, 4B are displaced toward one and another sides of the center line CL of the bottom of the craft as shown in the cross sectional view of FIG. 11(A). The discharge ducts 5A, 5B are arranged so that intake ports 5Aa, 5Ba thereof open at positions displaced toward one and another sides of the center line CL in the engine room 23. The rest of the configuration is similar to that of the previous embodiment. In FIG. 10, numeral 24 denotes an engine which drives the water jet propulsor 25.

In this configuration, because air in the engine room 23 is discharged from the discharge ports 4A, 4B, it is made possible not only to reduce the resistance at the back of the rear end of the strips 3 but also to effectively ventilate the engine room 23.

Figure 11A:
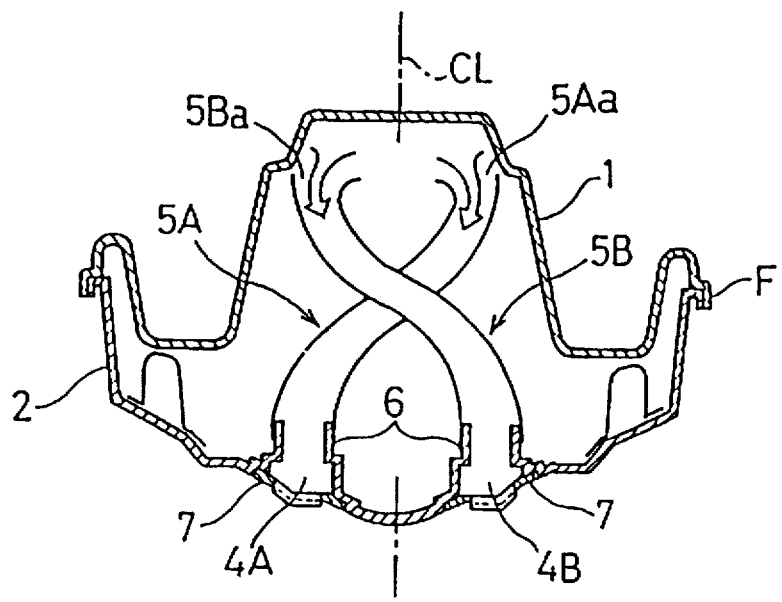
FIG. 11(A) is a cross sectional view of the small planing watercraft of the third embodiment.
Figure 11B:
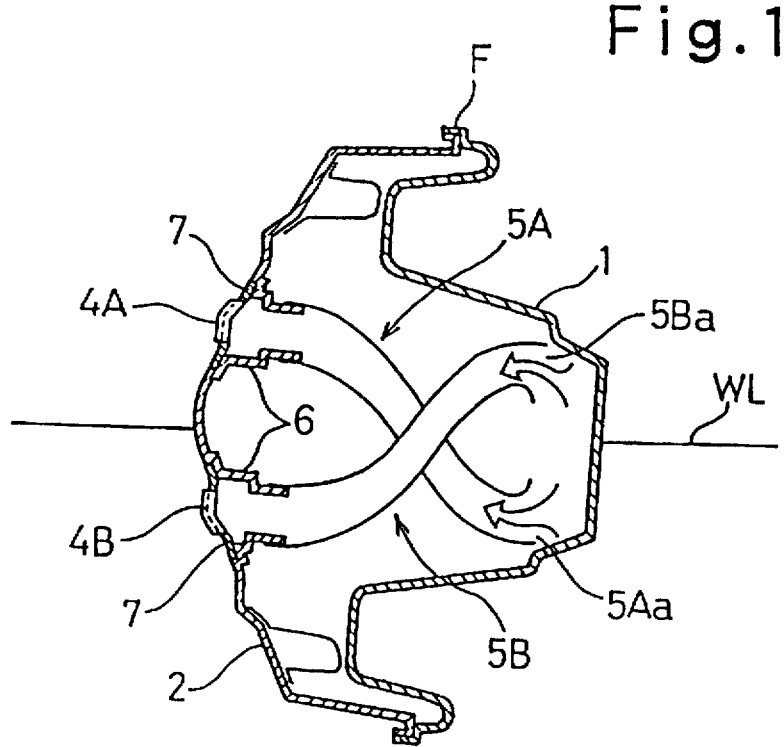
FIG. 11(B) is a cross sectional view of the small planing watercraft in a tipped state.

Further, as shown in FIG. 11(A), because positions of the discharge ports 4A, 4B and positions of the intake ports 5Aa, 5Ba of the discharge ducts 5A, 5B are displaced to opposite sides of the center line CL, when the craft is tipped so that the intake port 5a of one discharge duct 5A is immersed below the water line WL as shown in FIG. 11(B), the discharge port 4A opens above the water line WL, and therefore water does not enter the engine room 23 from the discharge duct 5A. Although the discharge port 4B of the other discharge duct 5B becomes lower than the water line WL, the intake port 5Ba thereof is higher than the water line WL, and therefore the water in the discharge duct 5B hardly enters the engine room 23 from the intake port 5Ba.

Figure 12:
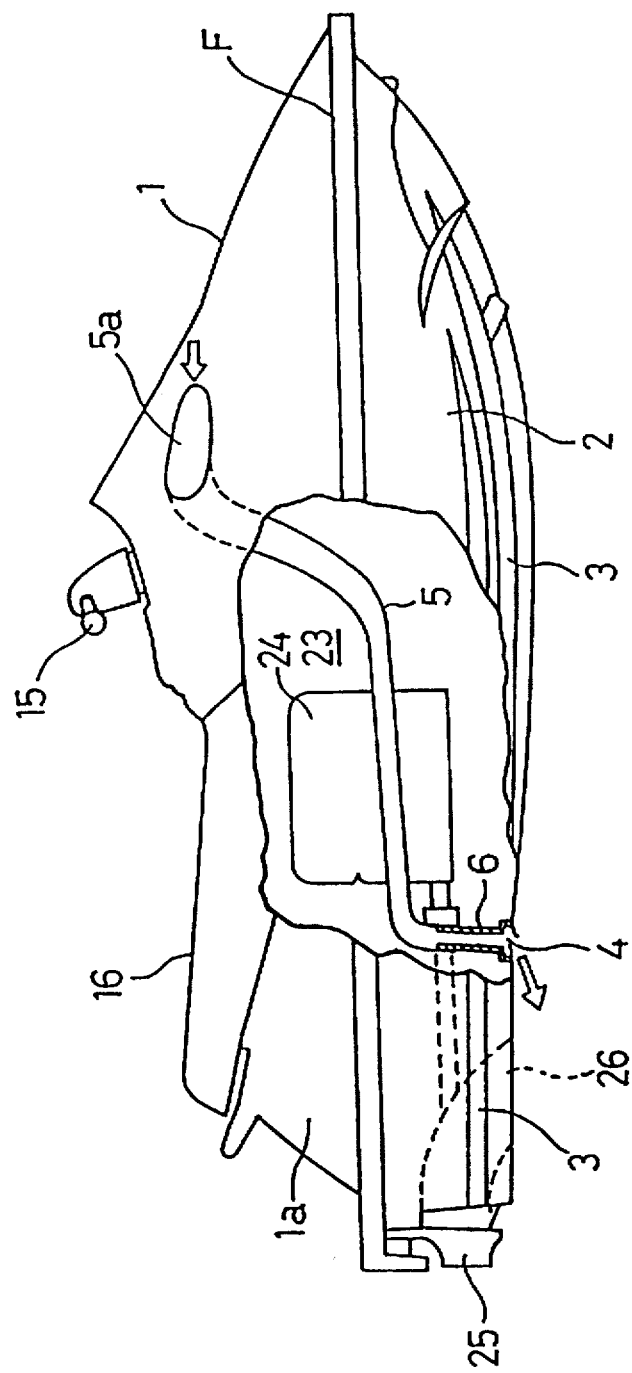
FIG. 12 is a side view of the small planing watercraft provided with the drag suppressing apparatus according to the fourth embodiment of the invention.

FIG. 12 shows a side view of a small planing watercraft provided with a drag suppressing apparatus according to a fourth embodiment of the invention. The craft body of this small planing watercraft is formed by bonding the deck 1 in the upper portion and the hull 2 in the lower portion, by mating the flanges F thereof. The deck 1 has a handle 15 installed thereon and a seat 16 installed on a seat base 1a behind the handle 15. Mounted on the bottom of the craft at the stern is a water jet propulsor 25 which is driven by the engine 24 to propel the craft body. Formed on the bottom of the craft are a plurality of strips 3 protruding therefrom and extending along the longitudinal direction of the craft body.

Figure 13:
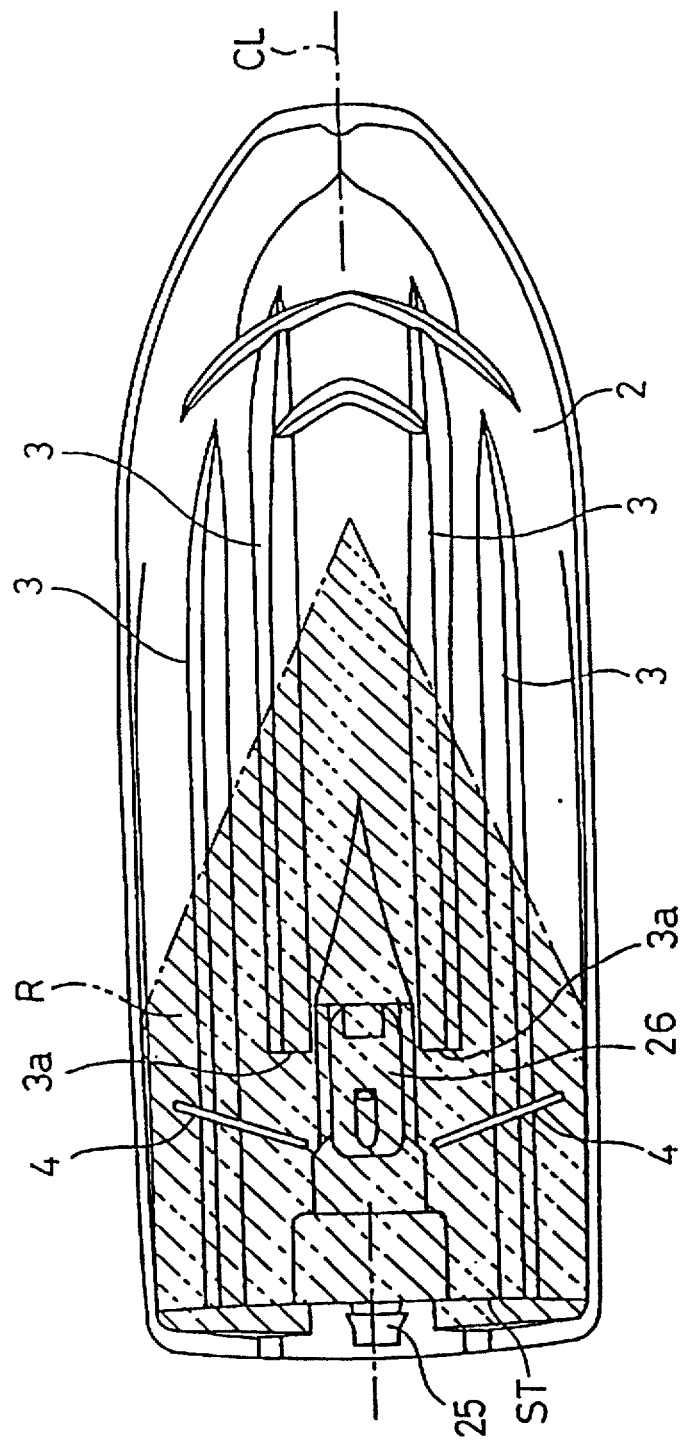
FIG. 13 is a bottom view of the small planing watercraft.
Figure 14:
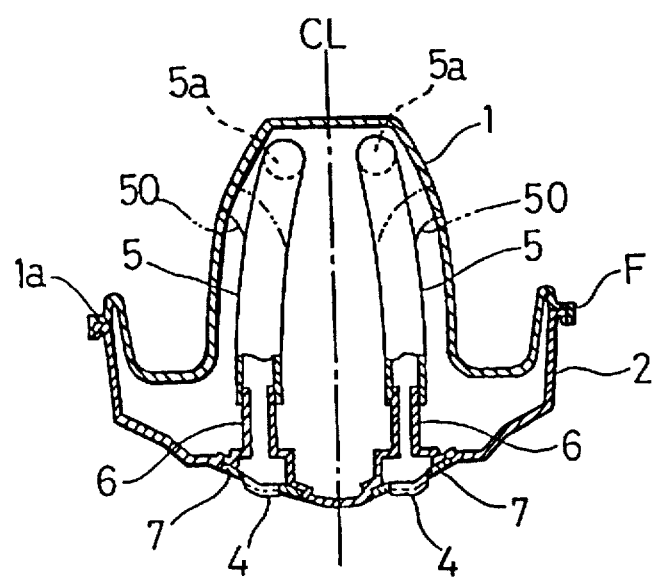
FIG. 14 is a cross sectional view of the small planing watercraft.

As shown in the bottom view of FIG. 13, the discharge ports 4 for discharging air into water are installed on the bottom of the craft in a part of region R which contacts water during running, for example on the right and left sides of a water intake port 26 of the water jet propulsor 25 installed on the bottom of the craft. As shown in FIG. 12 and FIG. 14, installed in the craft body are discharge ducts 5 which take in air from the outside of the craft body through the intake ports 5a which open forward on both sides at the front of the deck 1, for example, by using the ram pressure during running of the craft and guide the air into the discharge ports 4. The discharge ducts 5 are installed with rising gradient throughout the path from the discharge ports 4 to the intake ports 5a. This configuration prevents water entering from the discharge port 4 from staying in the discharge duct 5 and preventing the intake of air.

Figure 15A:
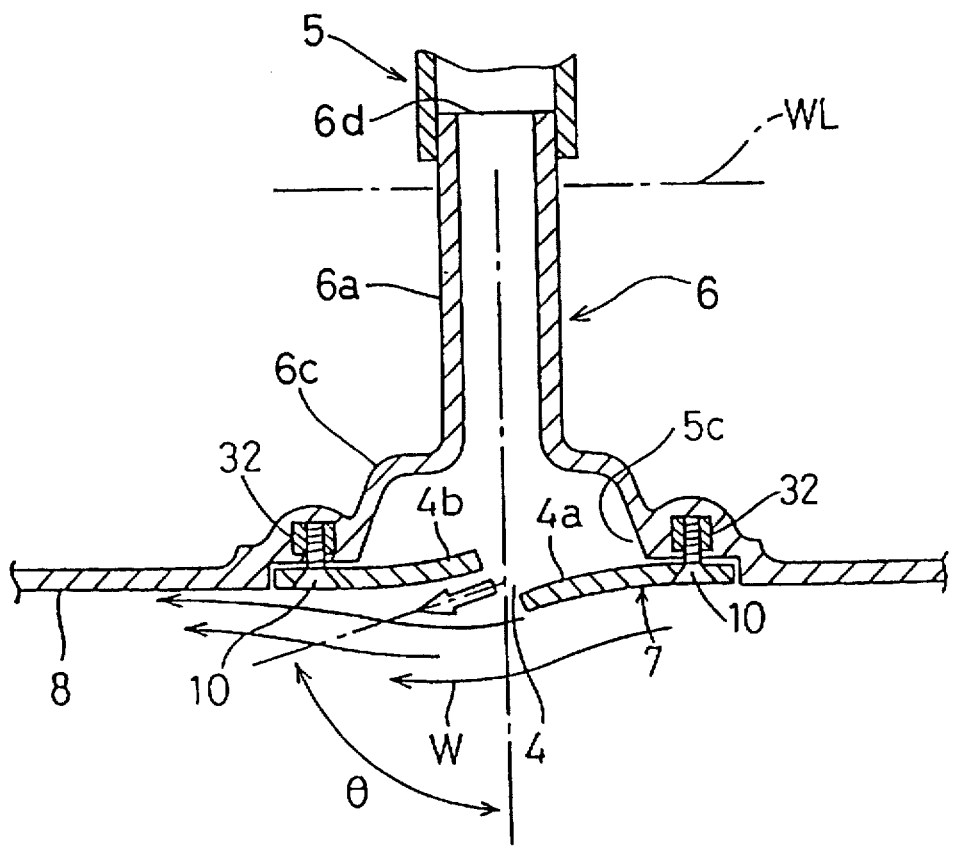
FIG. 15(A) is a longitudinal sectional view of the discharge port portion of the small planing watercraft.
Figure 15B:
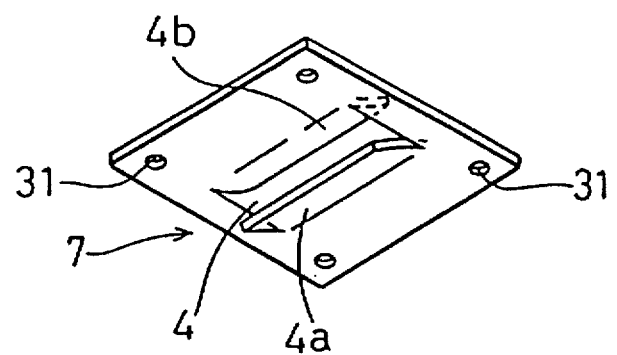
FIG. 15(B) is a perspective view of the cover provided with the discharge port.

The discharge path from the bottom end of the discharge duct 5 to the discharge port 4 constitutes the guide-out duct 6 which is integrally formed with the bottom wall 8 of the craft and opens in the bottom of the craft and the cover 7 which has the discharge port 4, as shown in FIG. 15(A). That is, the guide-out duct 6 has the duct portion 6a linked to the discharge duct 5 and a bottom end aperture 6c, with the cover 7 being installed detachably with screws 10 onto the bottom aperture 6c thereof. Installation of the cover 7 with the screws 10 s done by inserting the screws 10 through screw holes 31 (FIG. 15(B)) of the cover 7 and screwing them into nuts 32 which are embedded in the periphery of the bottom end aperture 6c of the guide-out duct 6. By forming the guide-out duct 6 integrally with the bottom wall 8 of the craft, the area around the discharge port 4 is sealed against water. The duct portion 6a of the guide-out duct 6 is extended upward beyond the water line WL of the time when the craft is at standstill, which is high enough to prevent the joint thereof with the discharge duct 5 from being immersed in water.

Because the cover 7 can be detached, troubles such as clogging of the discharge port 4 with sand can be removed, and the cover 7 can be freely changed according to the cross sectional shape of the bottom of the craft.

Upstream edge 4a of the discharge port 4 of the cover 7 in the outside water stream W is located slightly downward from the bottom wall 8 of the craft so that a negative pressure region is formed in the discharge port 4 as the outside water speed W increases. Downstream edge 4b of the discharge port 4 in the outside water stream is located slightly upward from the bottom wall 8 of the craft so that a negative pressure region is formed as the outside water stream separates. This causes the discharge port 4 to open backward or obliquely backward from the bottom of the craft, so that air guided from the guide-out duct 6 downward is deflected (deflection angle θ=about 60° to about 120°) and is discharged from the discharge port 4 backward or obliquely backward. Therefore, the craft can run in such a posture that the stern does not rise. A deflection angle θ greater than about 120° is not desirable because it makes it difficult to discharge air smoothly from the discharge port 4 backward, and a deflection angle below about 60° is not desirable because it causes the craft to run in such a posture as the stern rises.

Because a negative pressure region is generated at the discharge port 4 by the action of the upstream side edge 4a and the downstream side edge 4b of the discharge port 4 in the outside water stream, the discharge port 4 itself performs the function of sucking in air from the guide-out duct 6 and discharging it into water, thus increasing the discharging effect.

Figure 16:
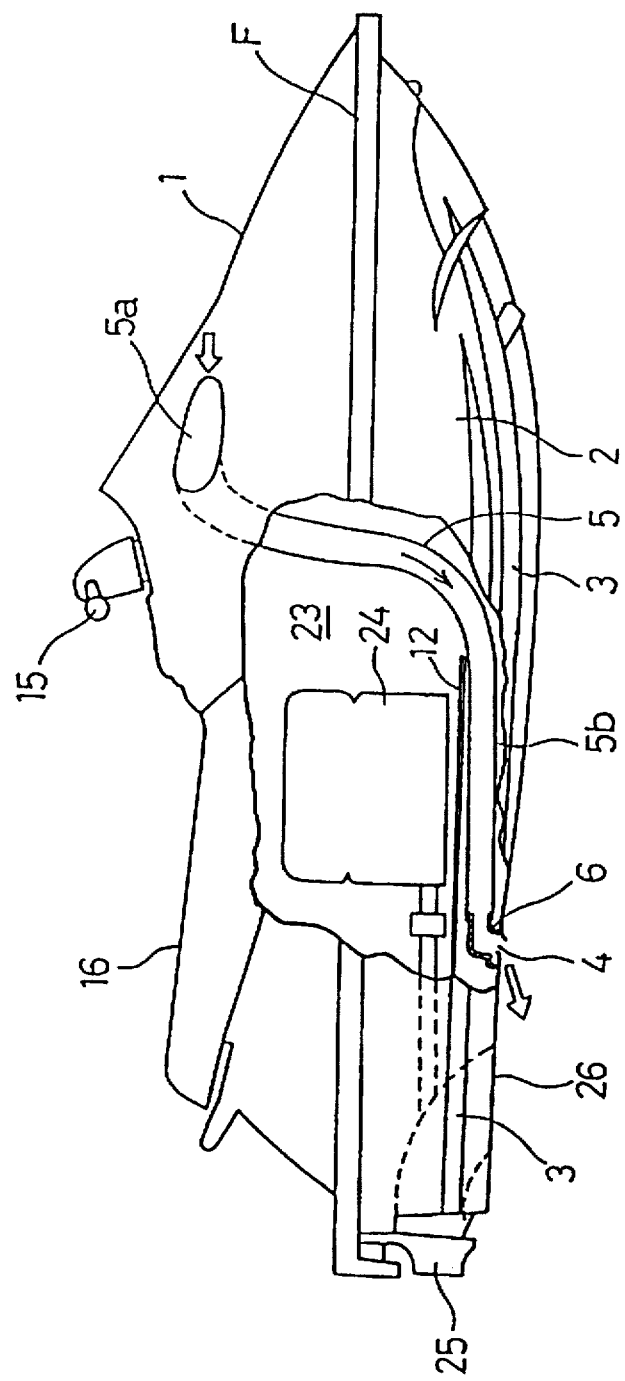
FIG. 16 is a side view showing a variation of the fourth embodiment of the invention.

The rear half 5b of the discharge duct 5 is located near the bottom of the craft as shown in FIG. 16 and is connected to the guide-out duct 6 which is formed with a short length. Also in this case, when the hull 2 is made in a double-bottom structure as described in FIG. 8 of the above second embodiment, the discharge ducts 5 are installed in the space between the bottom of the craft wall 8 and the inner wall member 12, thus preventing the effective space of the craft body from being decreased due to the piping of the discharge ducts 5.

As described with reference to FIG. 9, wherein the hull 2 is constructed by connecting with the reinforcement ribs 22, a part of the discharge ducts 5 is installed in the space between the bottom wall 8 of the craft and the reinforcement ribs 22, which can also be provided in the construction as shown in FIG. 16.

In the case of the small planing watercraft of the configuration described above, air outside of the craft body is taken into the intake port 5a of the discharge duct 5 by the ram pressure exerted onto the front face of the craft body and is discharged from the discharge port 4 backward or obliquely backward, and therefore discharged air coming between the bottom of the craft and the outside water stream W suppresses the friction resistance on the bottom of the craft. Therefore maximum craft speed can be increased and the acceleration performance can be improved. Also because the air region generated on the bottom of craft automatically deforms according to the craft speed, craft posture and turning maneuver, due to the air region, can be maintained in an ideal shape.

Figure 17:
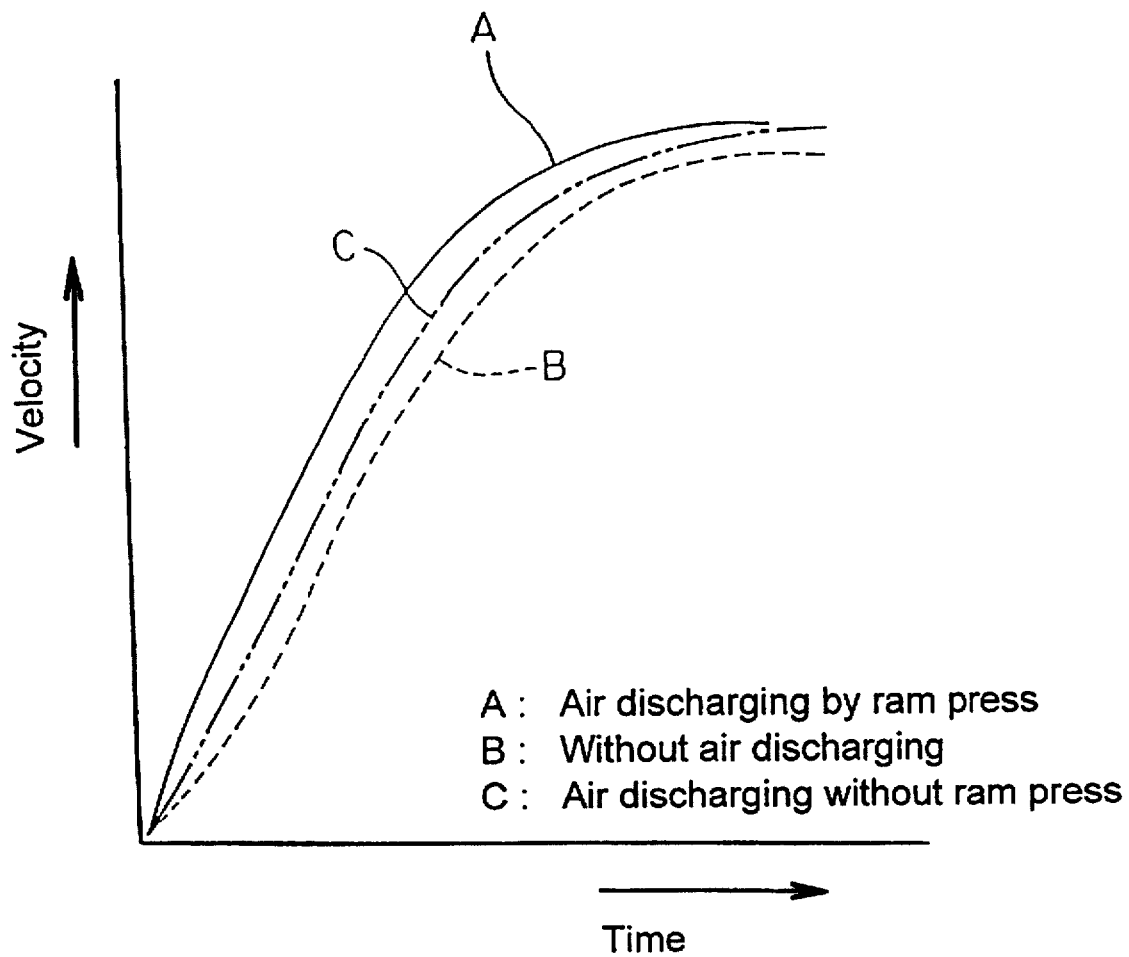
FIG. 17 is a graph showing acceleration performance of the small planing watercraft in comparison with another experimental planing watercraft.

FIG. 17 is a graph comparing acceleration performance in the case of a small planing watercraft where air is not discharged and the case of the small planing watercraft shown in FIG. 16 where the intake port 5a of the discharge duct 5 opens forward on the side of the deck 2. In this drawing, graph A drawn with solid line shows the acceleration characteristic of the small planing watercraft of the embodiment described above, and graph B drawn with dashed line shows the acceleration characteristic of the small planing watercraft without air discharging. Graph C drawn with chain two-dashed line shows the acceleration performance of a case where air is taken in and discharged from the discharge port 4 without using ram pressure, as shown by chain two-dashed line 50 in FIG. 14 for reference. As will be clear from this drawing, the small planing watercraft of the embodiment described above has better acceleration characteristic than the small planing watercraft without air discharging or with air discharging without ram pressure, because the air outside of the craft body is powerfully taken in and discharged from the bottom of the craft by using ram pressure, and the maximum craft speed is also increased.

Figure 18:
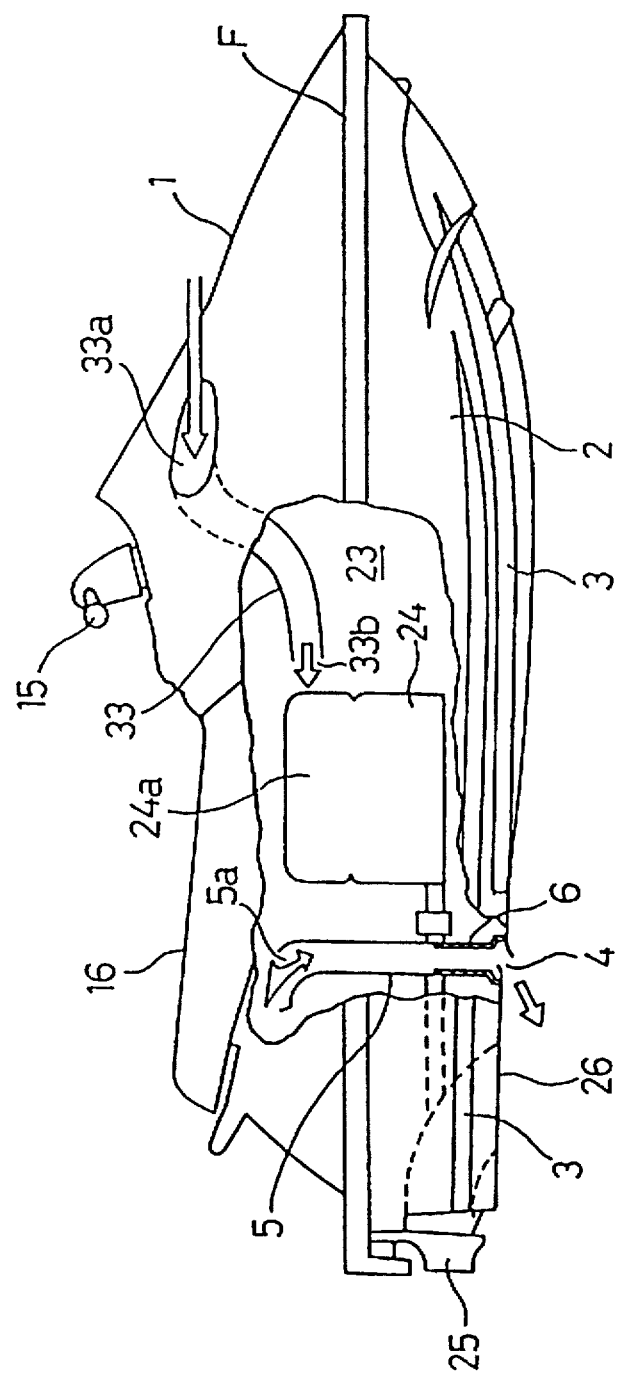
FIG. 18 is a side view of a small planing craft provided with a drag suppressing apparatus according to the fifth embodiment of the invention.

FIG. 18 shows a side view of a small planing craft provided with the drag suppressing apparatus according to a fifth embodiment of the invention. In this embodiment, a ram air duct 33 is installed in the craft body for taking in air from the outside of the craft body through the intake ports 33a opening forward on both sides of the front face of the deck 1 and guiding it to the engine room 23, and the discharge duct 5 is installed in the engine room 23 for sucking in air from the engine room 23 and guiding it to the discharge port 4 provided in the bottom of the craft. The guide-out port 33b of the ram air duct 33 is disposed near a carburetor 24a of the engine 24 so that air taken in from the outside of the craft body through the ram air duct 33 flows directly onto the carburetor 24a. With this configuration, because fresh air from the outside of the craft body is supplied to the engine 24, output power of the engine is improved.

In this embodiment, too, the position of the discharge port 4 and the position of the intake ports 5a of the discharge duct 5 are displaced to opposite sides of the center line CL, similarly to that shown in FIG. 11(A) in the aforementioned third embodiment. The rest of the configuration is similar to the fourth embodiment.

With this configuration, air outside of the craft is taken into the engine room 23 by the ram air duct 33 using ram pressure and air in the engine room 23 is guided by the discharge duct 5 and discharged from the discharge port into water, and therefore engine room 23 is effectively ventilated. This results in increased output power of the engine 24. It is the same as the previous embodiment in that air discharged from the discharge port 4 decreases the friction resistance on the bottom of the craft while the maximum craft speed is increased and the acceleration performance is improved.

Also because the position of the discharge port 4 and the position of the intake ports 5a of the discharge duct 5 are displaced to opposite sides of the center line CL, even when the craft is tipped so that the intake port 5Aa of one discharge duct 5A is immersed below the water line WL, as shown in FIG. 1(B) as described above, the discharge port 4A opens above the water line WL, and therefore water does not enter the engine room 23 from the discharge duct 5A. Although the discharge port 4B of the other discharge duct 5B becomes lower than the water line WL at this time, the intake port 5Ba is higher than the water line WL, and therefore water in the discharge duct 5B hardly enters into the engine room 23 from the intake port 5Ba.

Figure 19:
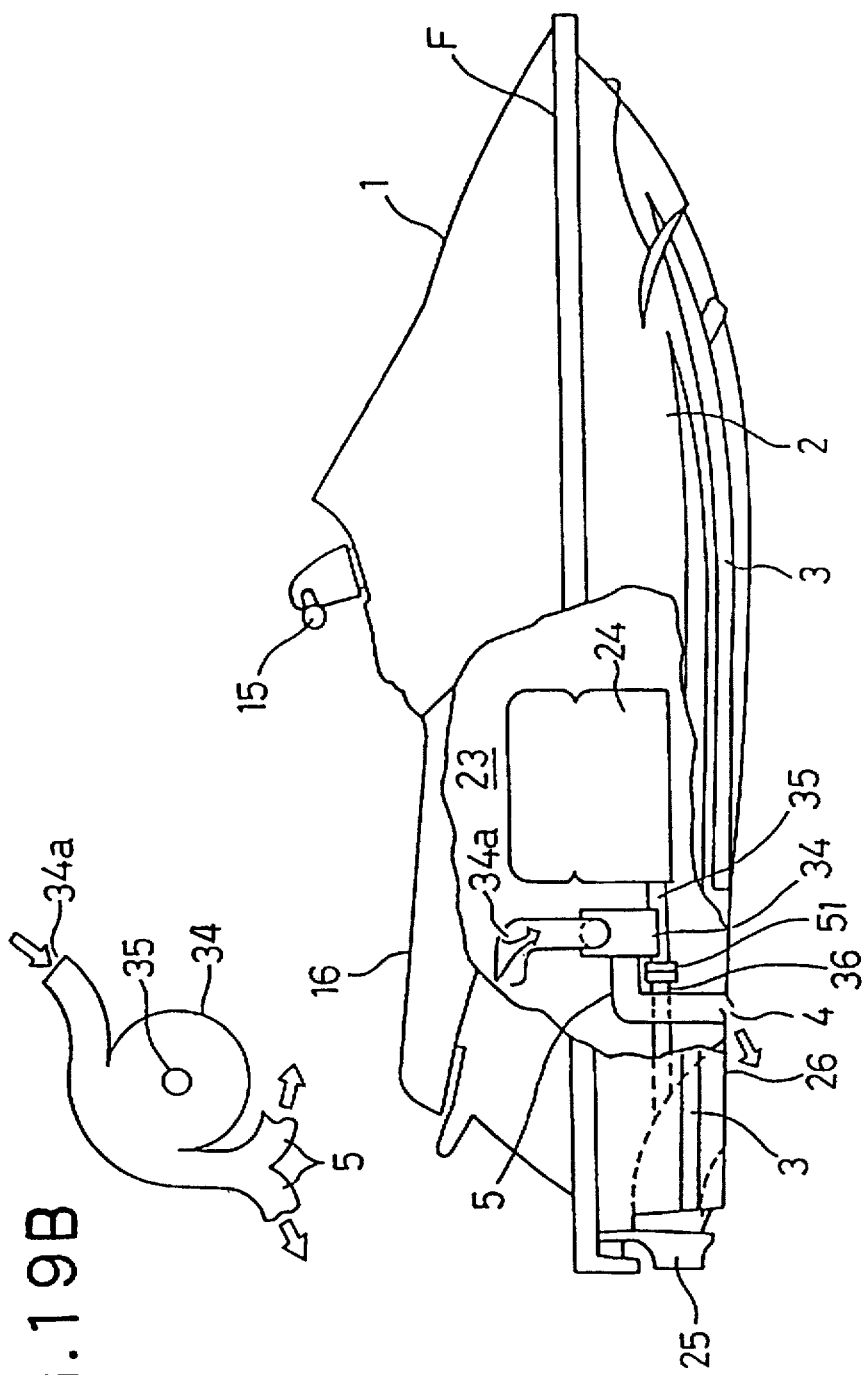
FIG. 19(A) is a side view of a small planing craft provided with the drag suppressing apparatus according to the sixth embodiment of the invention.
FIG. 19(B) is a front view of a pump in the small planing watercraft.

FIG. 19(A) shows side view of a small planing craft provided with a drag suppressing apparatus according to a sixth embodiment of the invention. In this embodiment, a pump 34 (FIG. 19(B)) which pumps air out of the engine room 23 and the discharge duct 5 which guides air delivered from the pump 34 to the discharge port 4 installed on the bottom of the craft are installed in the craft body, so that air in the engine room 23 is pumped out by the pump 34 and is discharged through the discharge port 4 into water. For example, the pump 34 is driven by the engine 24 via gears or belt linkage(which is not shown) which transmits the power from the output shaft 35 of the engine 24 to the pump 34. A drive shaft 36 of the water jet propulsor 25 is linked to the output shaft 35 via a coupling 51 in the drawing. Configurations of the discharge port 4 and the discharge duct 5 are similar to those of the previous embodiment.

With this configuration, because air in the engine room 23 is pumped out by the pump 34 through the discharge duct 5 and discharged from the discharge port 4 into water, a thick layer of discharged air is formed between the bottom of the craft and the outside water stream. Therefore, the friction resistance on the bottom of the craft is reduced and the maximum craft speed and the acceleration performance are greatly improved. Ventilation of the engine room 23 is also carried out more effectively.

Figure 20:
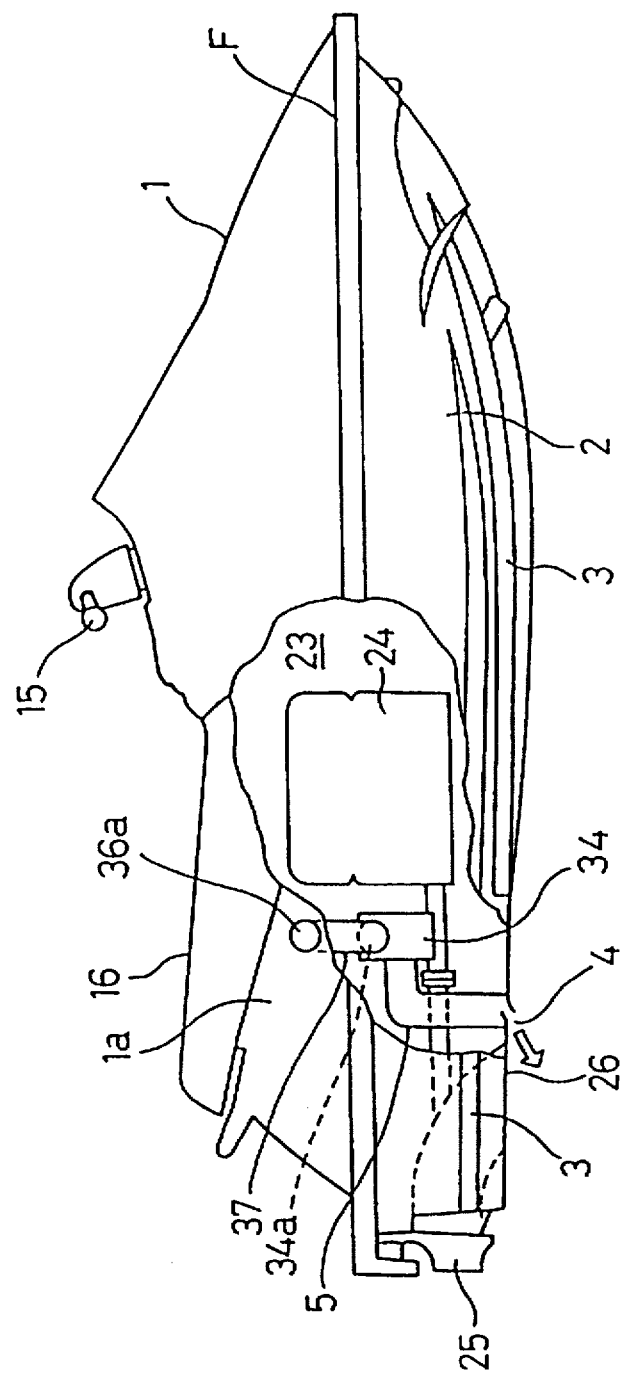
FIG. 20 is a side view of a small planing craft provided with a drag suppressing apparatus according to the seventh embodiment of the invention.

FIG. 20 shows a side view of a small planing watercraft provided with a drag suppressing apparatus according to the seventh embodiment of the invention. In this embodiment, the pump 34 sucks in air from the outside of the watercraft and air delivered from the pump 34 is guided by the discharge duct 5 to the discharge port 4 installed on the bottom of the craft body. The intake port 34a of the pump 34 is linked to an air duct 37 of which intake port 36a opens on the side face of the seat base 1a of the deck 1, for example. The rest of the configuration is similar to that of the fourth.

With this configuration, because air outside of the craft body is strongly discharged from the discharge port 4 by the pump 34 through the discharge duct 5 into water, a thick layer of discharged air is formed between the bottom of the craft and the outside water stream W. Therefore, the friction resistance on the bottom of the craft is reduced and the maximum craft speed and the acceleration performance are greatly improved.

Figure 21:
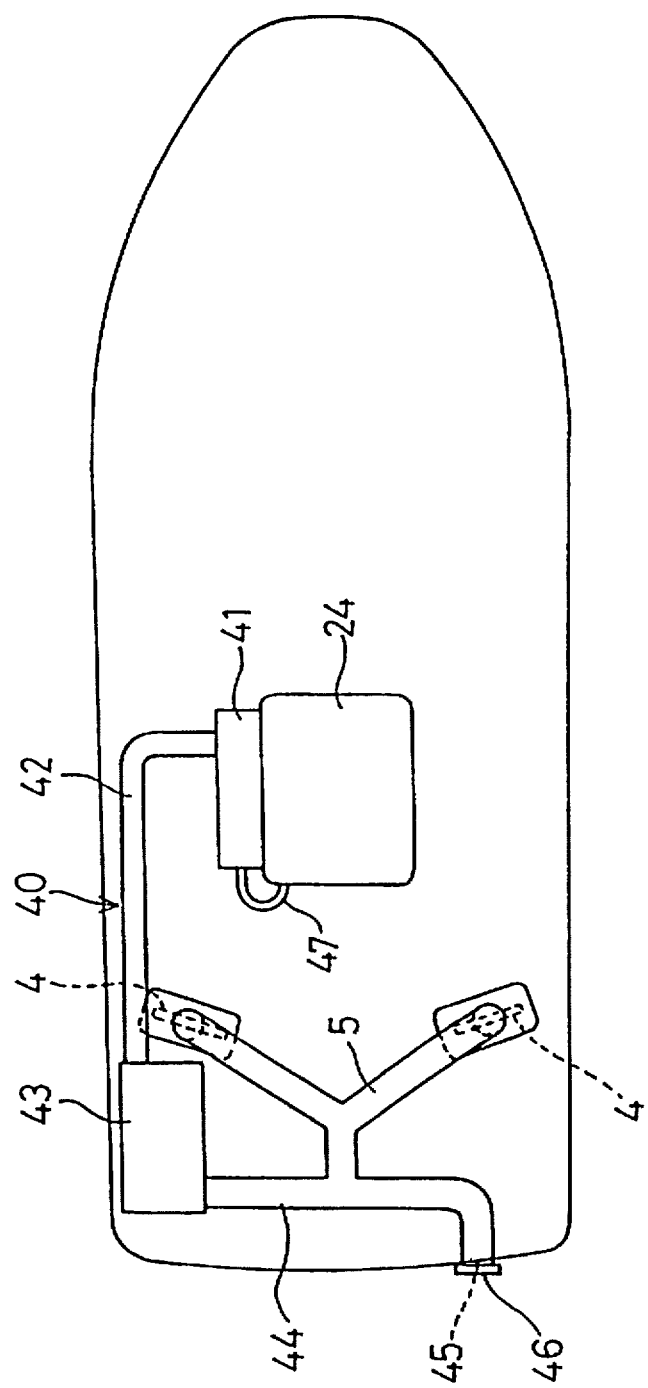
FIG. 21 is a plan view showing the schematic configuration of a small planing watercraft provided with a drag suppressing apparatus according to the eighth embodiment of the invention.

FIG. 21 shows a schematic plan view of a small planing watercraft provided with a drag suppressing apparatus according to the eighth embodiment of the invention. In this embodiment, the discharge duct 5 is connected to an exhaust path 40 at a mid point thereof which discharges exhaust gas of the engine 24, and at least a part of the exhaust gas is guided by the discharge duct 5 to the discharge port 4. The exhaust path 40 comprises a muffler 41 of the engine 24, a water muffler 43 which is connected to the muffler 41 via a first exhaust pipe 42 and a second exhaust pipe 44 which is connected to the water muffler 43 and opens at the stern, while the discharge duct 5 is connected to the second exhaust pipe 44 at a mid point thereof. An exhaust port 45 at the end of the exhaust pipe 44 has a rubber cover 46 installed thereon to be capable to open and close freely. A water jacket of the engine 24 is supplied with cooling water which is introduced from a high-pressure section of the water jet propulsor 25 (refer to FIG. 13). The cooling water runs out of said water jacket, and enters into a muffler 41 through a water pipe 47, then, mixed with the exhaust gas, and thereafter discharged from the exhaust port 45 into atmosphere via said exhaust path 40. Configurations of the discharge port 4 and the discharge duct 5 are similar to those of the fourth embodiment.

In the case of this configuration, because at least a part of the exhaust gas from the engine 24 is forced out of the exhaust path 40 at a mid point thereof to pass through the discharge duct 5 and discharged from the discharge port 4 located at the bottom of the craft into water, a layer of discharged gas is generated in the space between the bottom of the craft and the outside water stream W without using the pump 34 unlike the previous embodiment. Therefore, friction resistance on the bottom of the craft is reduced and the maximum craft speed and the acceleration performance are improved. Alternatively, all of the exhaust gas may be discharged through the discharge duct and the discharge port 4, in which case exhaust gas is discharged into water resulting in reduced exhaust noise.

The discharge port 4 in each of the embodiments may also be located at, for example, behind the rear end 3a of one of the spray strips 3 which is near the center line CL of the craft body of FIG. 13. In this case, negative pressure generated in the space behind the rear end 3a of the spray strip where it is stepped can be decreased by air discharged from the discharge port 4, thereby reducing the pressure resistance and friction resistance to improve the maximum craft speed and the acceleration performance.

Figure 22:
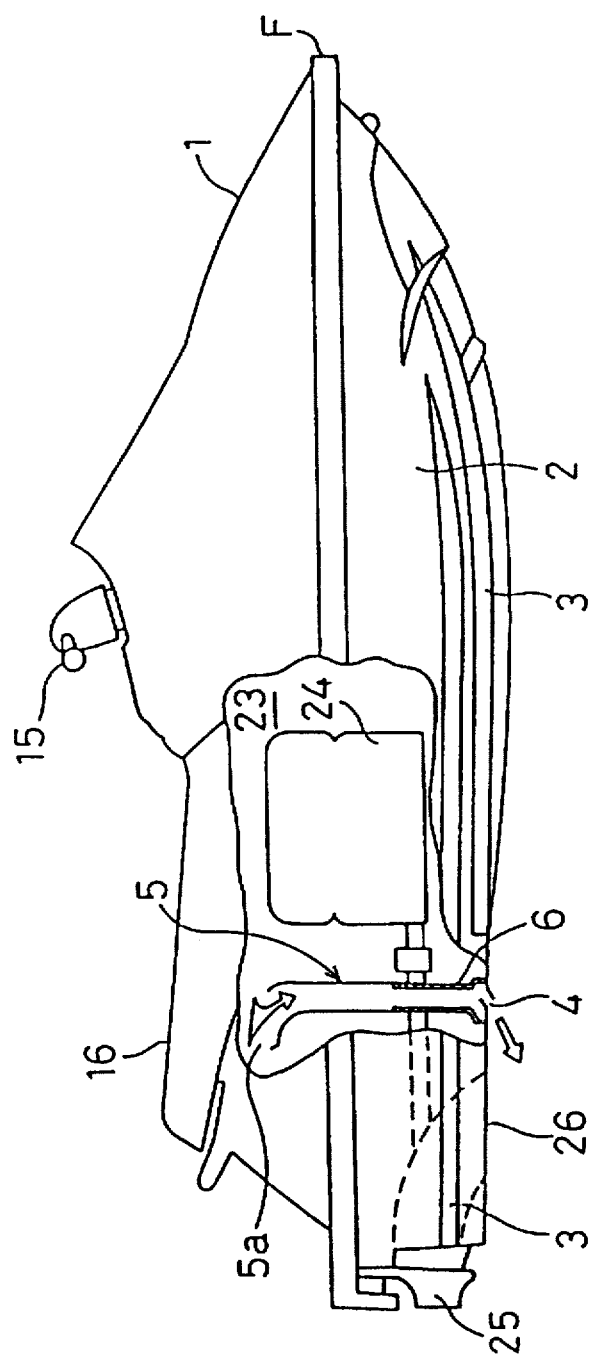
FIG. 22 is a side view of a small planing watercraft provided with a drag suppressing apparatus according to the ninth embodiment of the invention.

FIG. 22 shows a side view of a small planing watercraft provided with the drag suppressing apparatus according to a ninth embodiment of the invention. The craft body of this small planing watercraft is formed by bonding the deck 1 in the upper portion and the hull 2 in the lower portion, by mating the flanges F thereof. The deck 1 has a handle 15 installed thereon and a seat 16 installed behind thereof. Mounted on the bottom of the craft at the stern is a water jet propulsor 25 which is driven by the engine 24 to propel the craft body. Formed on the bottom of the craft are a plurality of strips 3 protruding thereon and extending along the longitudinal direction of the craft.

Figure 23:
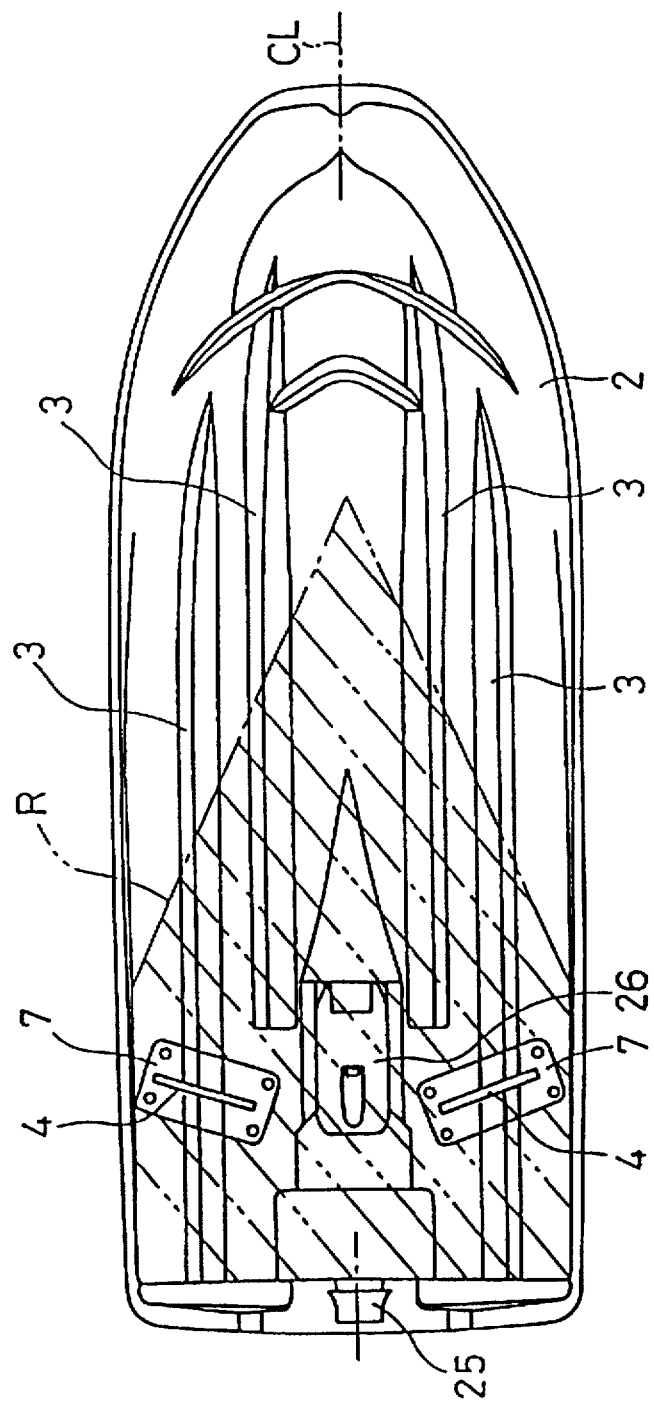
FIG. 23 is a bottom view of the small planing watercraft.

As shown in the bottom view of FIG. 23, the discharge ports 4 for discharging air into water are installed on the bottom of the craft in a part of region R which contacts water during running, for example on the right and left sides of the water intake port 26 of the water jet propulsor 25 installed on the bottom of the craft. As shown in FIG.22, installed in the craft body are discharge ducts 5 which take in air from the engine room 23 through the intake ports 5a located in the engine room 23 and guide the air into the discharge ports 4.

In this case, as shown in FIG. 11(A), (B), the discharge ducts 5A, 5B are arranged in such a way that positions of the discharge ports 4A, 4B and positions of the intake ports 5Aa, 5Ba are displaced to opposite sides of the center line CL of the craft body, similarly to the third embodiment described in conjunction with FIG. 11(A), (B).

In addition, as shown in FIG. 15(A), the discharge duct 5 of FIG. 22 also opens in the bottom of the craft via the guide-out duct 6 with the aperture 5c being covered by the cover 7, similarly to the fourth embodiment as described in conjunction with FIG. 15(A). The cover 7 is installed detachably with screws 10 onto the guide-out duct 6. By forming the guide-out duct 6 integrally with the bottom wall 8 of the craft, the area around the discharge port 4 is sealed against water. It is also the same that an upper end aperture 6d of the guide-out duct 6 located in the engine room 23 is positioned above the water line WL during the time when the craft is at standstill, which is high enough to prevent the joint thereof from being immersed in water.

Because the discharge port 4 and the guide-out duct 6 are made in such configurations, the discharge port 4 can be located at a desired position in the region R where the bottom of the craft contacts with water thereby increasing the degree of freedom in design, even when the bottom of the craft has a configuration without step. Also because the cover 7 can be detached, troubles such as clogging of the discharge port 4 with sand can be removed. By preparing a plurality of covers 7 of different cross sectional shapes corresponding to various craft bodies of different bottom shapes, difference in the bottom of the craft shapes can be freely accommodated by selecting a proper cover 7.

As shown in FIG. 15(A), (B), the upstream side edge 4a of the discharge port 4 of the cover 7 in the outside water stream W is located slightly downward from the bottom wall 8 of the craft so that a negative pressure region is formed in the discharge port 4 as the outside stream speed W increases. Downstream side edge 4b of the discharge port 4 in the outside water stream is located slightly upward from the bottom wall 8 of the craft so that a negative pressure region is formed as the outside water stream W separates, similarly to the fourth embodiment described with reference to FIG. 15.

In the case of the small planing watercraft of this configuration, because a negative pressure region is generated at the discharge port 4 by the action of the upstream side edge 4a and the downstream side edge 4b of the discharge port 4 in the outside water stream during running of the craft, the discharge port 4 itself performs the function of sucking in air from the engine room 23 sucking it through the discharge duct 5 and discharging it into water, causing a layer of discharged air to be generated between the bottom of the craft and the outside water stream W and thereby reducing the friction resistance on the bottom of the craft. This also causes the engine room 23 to be ventilated.

Figure 24:
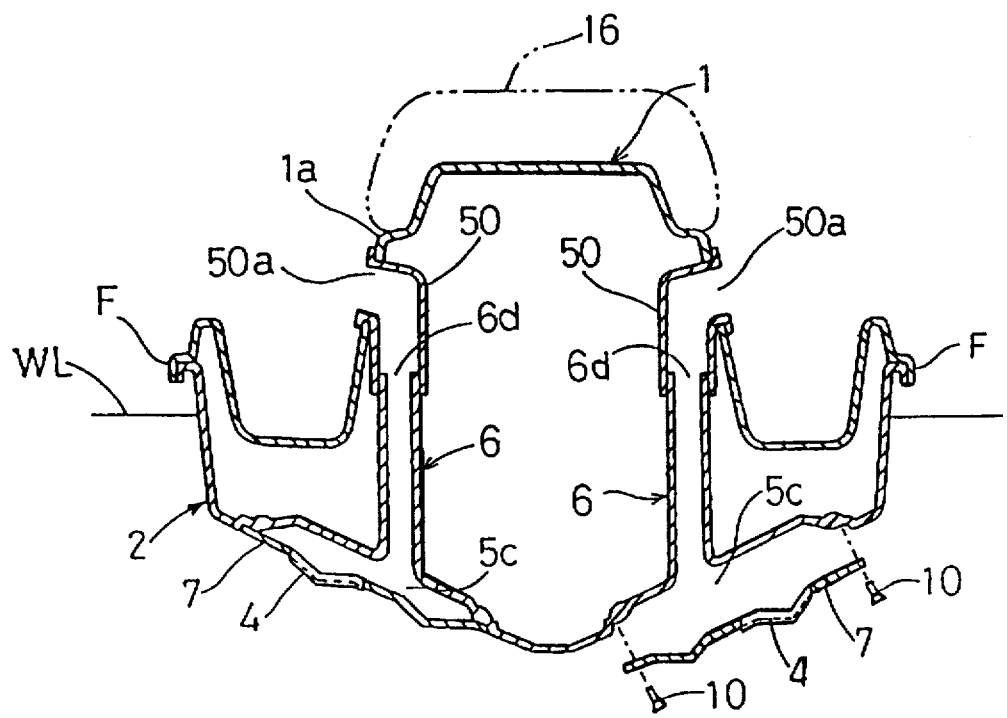
FIG. 24 is a cross sectional view of a small planing watercraft provided with a drag suppressing apparatus according to the tenth embodiment of the invention.

FIG. 24 shows a cross sectional view of a small planing watercraft provided with the drag suppressing apparatus according to tenth embodiment of the invention. In this embodiment, an intake duct 50 which takes in air from the outside of the craft body and introduces it into the guide-out duct 6 is connected to the guide-out duct 6. The intake duct 50 is installed on the deck 1 so that an intake port 50a thereof opens on the side face of the seat base 1a of the deck 1, for example. The rest of the configuration is similar to that of the ninth embodiment.

With this configuration, air outside of the craft body is smoothly taken in by the intake duct 50 and is discharged through the guide-out duct 6 into water from the discharge port 4. In this case the cover 7, installed detachably on the aperture 5c of the guide-out duct 6 which is integrally formed with the bottom wall 8 of the craft, is made to cover a considerably wide area of the bottom of the craft, various improvement in craft shape can be easily made according to the each situation by changing the cover 7 according to the cross sectional shape of the bottom of the craft.

Figure 25:
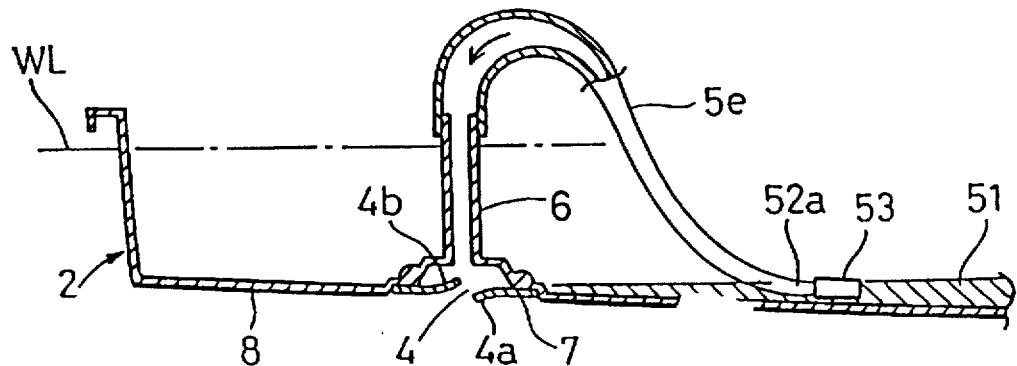
FIG. 25 is a longitudinal sectional view of an important portion of a small planing watercraft provided with a drag suppressing apparatus according to the eleventh embodiment of the invention.

FIG. 25 shows a longitudinal sectional view of an important portion of a small planing watercraft provided with a drag suppressing apparatus according to eleventh embodiment of the invention. In this embodiment, an intake duct 5e which takes in bilge water 51 in the craft is connected to the guide-out duct 6. A filter 53 is installed in an intake port 52a of the bilge water intake duct 5e, with the filter 53 being arranged on the bottom of the craft where the bilge water 51 accumulates. Configuration of the guide-out duct 6 and the cover 7 is similar to that of the ninth embodiment.

With this configuration, the sucking operation of the discharge port 4 which works when the craft is running causes the bilge water 51 to be sucked from the craft through the filter 53 and the bilge water intake duct 5e to the guide-out duct 6, and discharged into water from the discharge port 4. In this case, too, as the location of the discharge port 4 is not limited to the low-pressure area of the water jet propulsor 25 as in the case of the prior art, degree of freedom in design is increased.

Although the above embodiments are described in the case of discharging air or bilge water, the invention is not limited to such cases and can be applied to discharging an exhaust gas of the engine 24.

Figure 26:
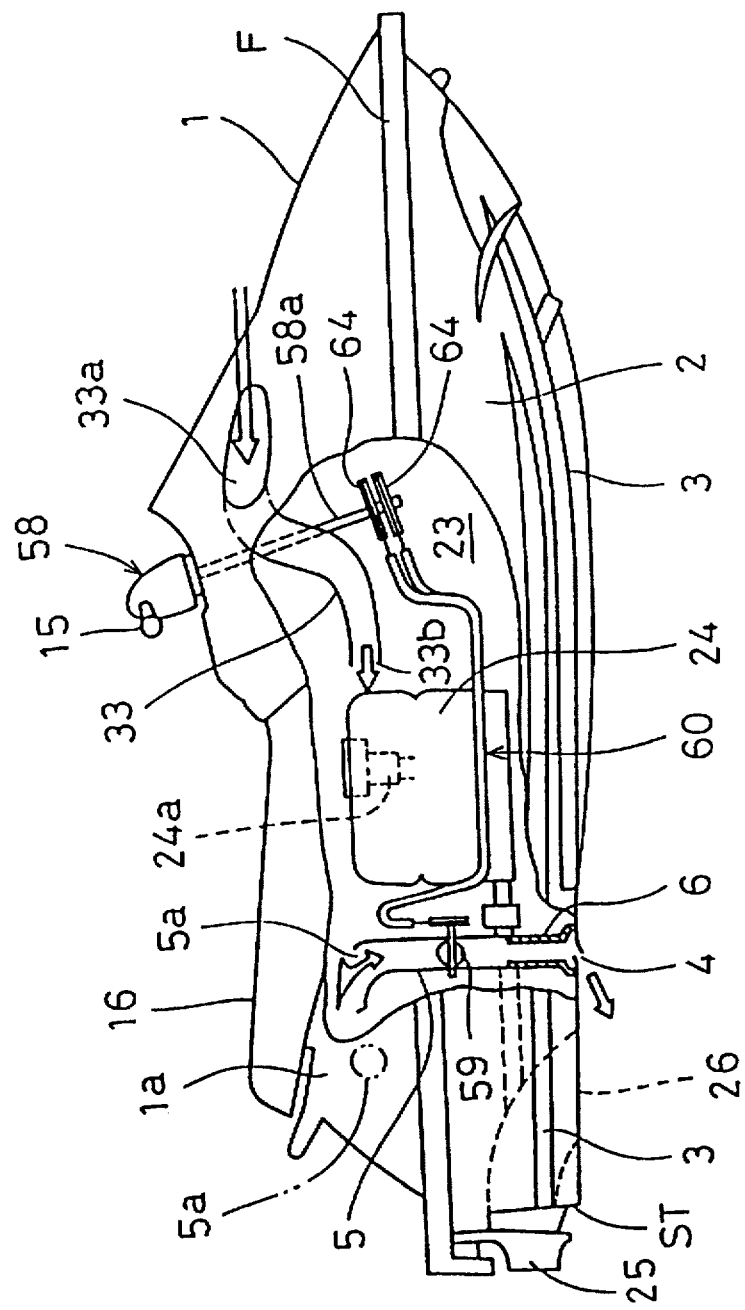
FIG. 26 is a side view of a small planing watercraft provided with a drag suppressing apparatus according to the twelfth embodiment of the invention.

FIG. 26 shows a side view of a small planing watercraft provided with a drag suppressing apparatus according to the twelfth embodiment of the invention. The craft body of this small planing watercraft is formed by joining the deck 1 as the upper portion and the hull 2 as the lower portion, by mating the flanges F thereof. The deck 1 has a steering handle 15 installed thereon and a seat 16 installed behind thereof. Mounted on the bottom of the craft at the stern is the water jet propulsor 25 which is driven by the engine 24 to propel the craft body. Formed on the bottom of the craft are a plurality of spray strips 3 protruding therefrom and extending along the longitudinal direction of the craft.

Similarly to the fourth embodiment shown in FIG. 13, the discharge ports 4 for discharging air into water are installed on the bottom of the craft in a part of region R which contacts water during running, for example on the right and left sides of the water intake port 26 of the water jet propulsor 25 installed on the bottom of the craft. Installed in the craft body are a ram air duct 33 which takes in air from the outside of the craft body through the intake ports 33a, which open forward on both sides at the front face of the deck 1, into the engine room 23 by using the ram pressure during running. Also the discharge duct 5 is installed in the engine room 23 for sucking in air from the engine room 23 and guiding it to the discharge port 4 provided in the bottom of the craft. The guide-out port 33b of the ram air duct 33 is disposed near a carburetor 24a of the engine 24 so that air taken in from the outside of the craft body through the ram air duct 33 flows directly onto the carburetor 24a. With this configuration, because fresh air from the outside of the craft body is supplied to the carburetor 24a, the output power of the engine is improved.

Figure 27A:
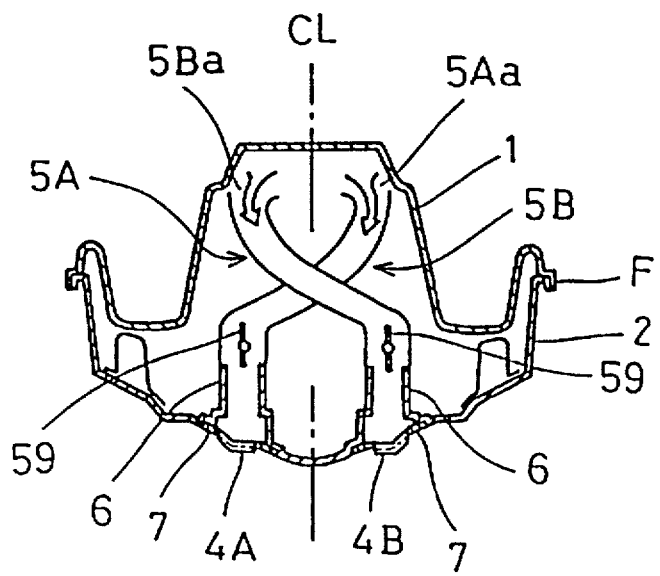
FIG. 27(A) is a cross sectional view of the small planing watercraft and FIG. 27(B) is a cross sectional view of the small planing watercraft in a tipped state.

The position of the discharge port 4 for discharging the air into water and the position of the intake port 5a of the discharge duct 5 are displaced to opposite sides of the center line CL with respect to each other as shown in FIG. 27(A). This configuration prevents water from entering in the craft through the discharge duct 5 when the craft body 1 is tipped, as will be described later.

The discharge path from the bottom end of the discharge duct 5 to the discharge port 4 is similar to that described in conjunction with the fourth embodiment with reference to FIG. 15(A). As shown in FIG. 15(A), by forming the guide-out duct 6 integrally with the bottom wall 8 of the craft, the area around the discharge port 4 is made watertight. The duct portion 6a of the guide-out duct 6 is extended upward beyond the water line WL of the time when the craft is standstill (with crew on board), in order to prevent water from entering in the craft through the joint thereof with the discharge duct 5. Also because the cover 7 can be easily detached, troubles such as clogging of the discharge port 4 with sand can be removed, and the cover 7 can be freely changed according to the cross sectional shape of the bottom of the craft. The upstream side edge 4a of the discharge port 4 of the cover 7 in the outside water stream W is located slightly downward from the bottom wall 8 of the craft so that a negative pressure region is formed in the discharge port 4 as the outside stream speed W increases. The downstream side edge 4b of the discharge port 4 in the outside water stream is located slightly upward from the bottom wall 8 of the craft so that a negative pressure region is formed as the outside water stream W separates, similarly to the fourth embodiment described previously.

Installed on the discharge duct 5 shown in FIG. 26 at a mid point thereof is a control valve 59 comprising a butterfly valve which controls the air flow rate through the discharge duct 5. The opening degree of the control valve 59 is controlled by means of valve driving means 60. The control valve 59 comprises a support shaft 59a rotatably installed by penetrating through the discharge duct 5 in the direction perpendicular to the center axis thereof, and a disk-shaped valve body 59b which is fixed on the support shaft 59a to rotate therewith, thereby to change the passage area in the discharge duct 5 as shown in FIG. 28(B).

The valve driving means 60 works in linkage with the steering device 58 shown in FIG. 26, thereby to drive the control valve 59 to decrease the opening thereof as the swing angle of the steering device 58 increases, and comprises a driven rotor 62 which is linked to the support shaft 59a of the control valve 59 rotatably via a torsion spring 61, and a transmission means 63 which works in linkage with the steering device 58 to drive the driven rotor 62 to rotate, as shown in FIGS. 28 (A), (B).

Figure 28A:
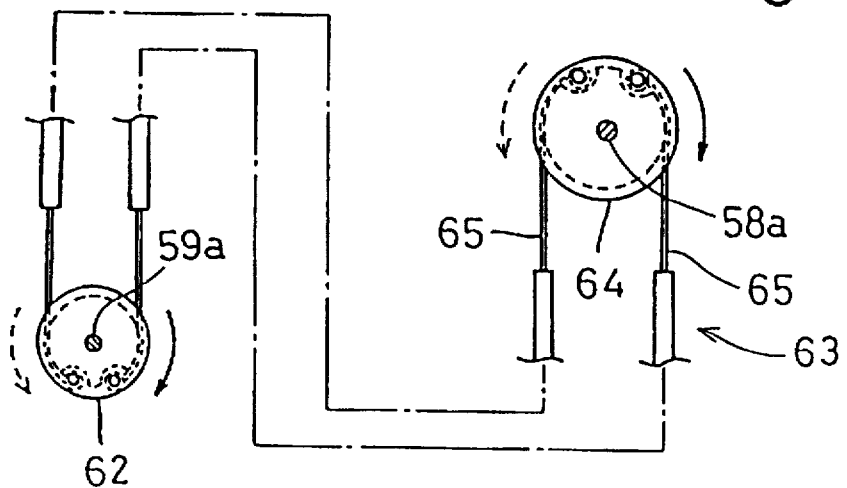
FIG. 28(A) is a plan view of a valve driving means of the small planing watercraft.
Figures 28B, 28C:
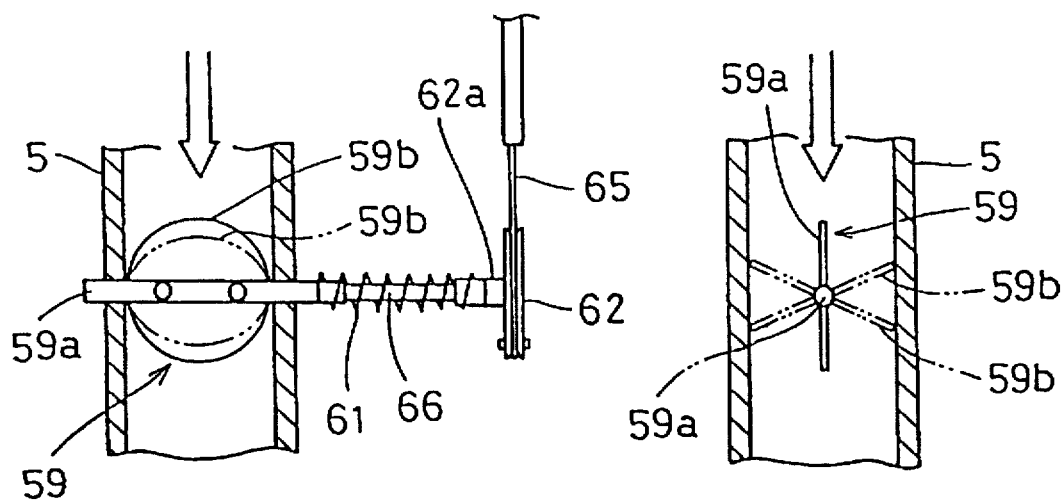
FIG. 28(B) is a front view of a control valve.
FIG. 28(C) is a side view of the control valve and FIG. 28(D) is a partially cutaway front view showing linkage mechanism of the control valve and the driven rotor.

The transmission means 63 comprises a drive rotor 64 fixed on the handle shaft 58a of the steering device 58, a wire 65 which links the drive rotor 64 and the driven rotor 62, and others, as shown in FIG. 28(A). The transmission means 63 are provided in a pair corresponding to the pair of control valves 59 of the right and left discharge ducts 5, with a pair of corresponding drive rotors 64 being connected to the handle shaft 58a of the steering device 58, one on another, as shown in FIG. 26.

Figure 28D:
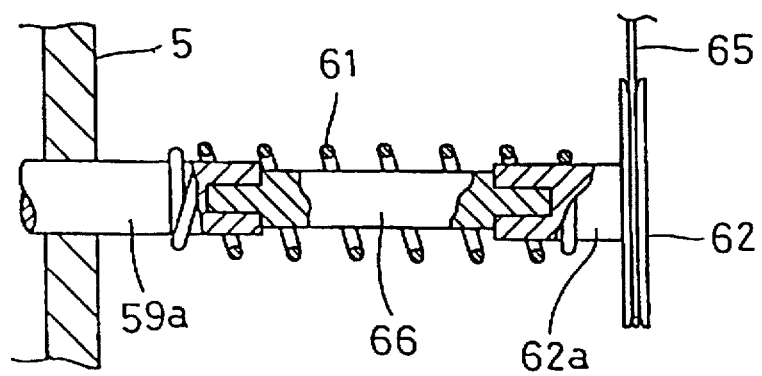

As shown in FIG. 28(D), the support shaft 59a of the control valve 59 is linked to the shaft 62a of the driven rotor 62 freely rotatably with respect to each other via a rotary linkage shaft 66, while rotating force of the driven rotor 62 is transmitted to the support shaft 59a of the control valve 59 via the torsion spring 61. Even when the driven rotor 62 receives, from the steering device 58 via the transmission means 63, a swing motion greater than that required for the control valve 59 to fully close the discharge duct 5, the excess portion of the swing motion beyond that required for the control valve 59 to fully close is absorbed by the torsion spring 61. Therefore, the control valve 59 can be fully closed at once by swinging the steering device 58 slightly in the entire range of swinging of the steering device 58.

With this configuration, because air outside of the craft body is taken into the engine room 23 by the ram air duct 33 using ram pressure, ventilation of the engine room 23 is carried out effectively. This increases the output power of the engine 24. Also because air in the engine room 23 is guided by the discharge duct 5 and is discharged from the discharge port 4 located at the bottom of the craft into water backward or obliquely backward, discharged air coming between the bottom of the craft and the outside water stream W suppresses the friction resistance on the bottom of the craft. Therefore maximum craft speed can be increased and the acceleration performance can be improved. Also because the air region generated on the bottom of craft automatically deforms according to the craft speed, posture and turning maneuver, the air region can be maintained in an ideal shape.

Figure 27B:
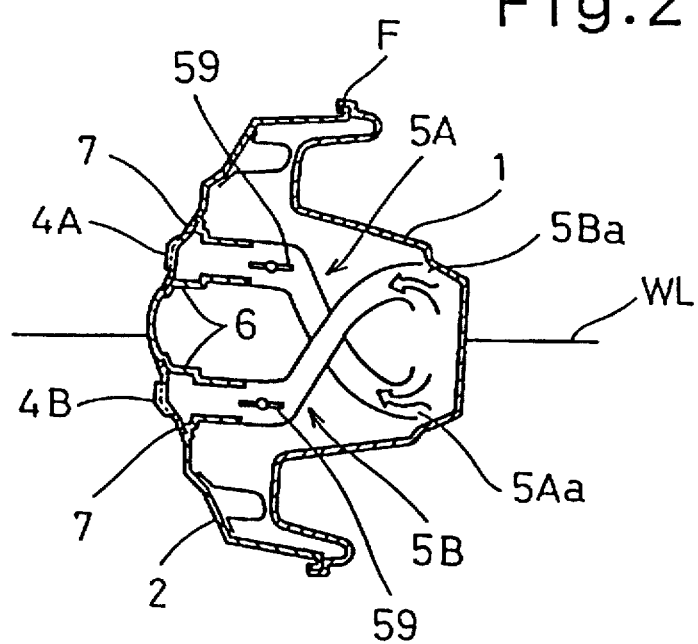

Also because the position of the discharge port 4 and the position of the intake ports 5a of the discharge duct 5 are displaced to opposite sides of the center line CL as shown in FIG. 27(A), even when the craft is tipped so that the intake port 5Aa of one discharge duct 5A is immersed below the water line WL, as shown in FIG. 27(B), the discharge port 4A opens above the water line WL, and therefore water does not enter the engine room 23 from the discharge duct 5A. Although the discharge port 4B of the other discharge duct 5B becomes lower than the water line WL at this time, the intake port 5Ba is higher than the water line WL, and therefore water in the discharge duct 5B hardly enters the engine room 23 from the intake port 5Ba.

During a turning maneuver, because the valve driving means 60 drives the control valve 59 to decrease the opening thereof as indicated by the dot and dash line in FIG. 28(C), the amount of air discharged from the discharge port 4 into water is limited thereby suppressing the decrease in the friction resistance on the bottom of the craft due to the discharged air. Thus sideways skidding of the craft body during a turning maneuver can be suppressed.

Figure 29:
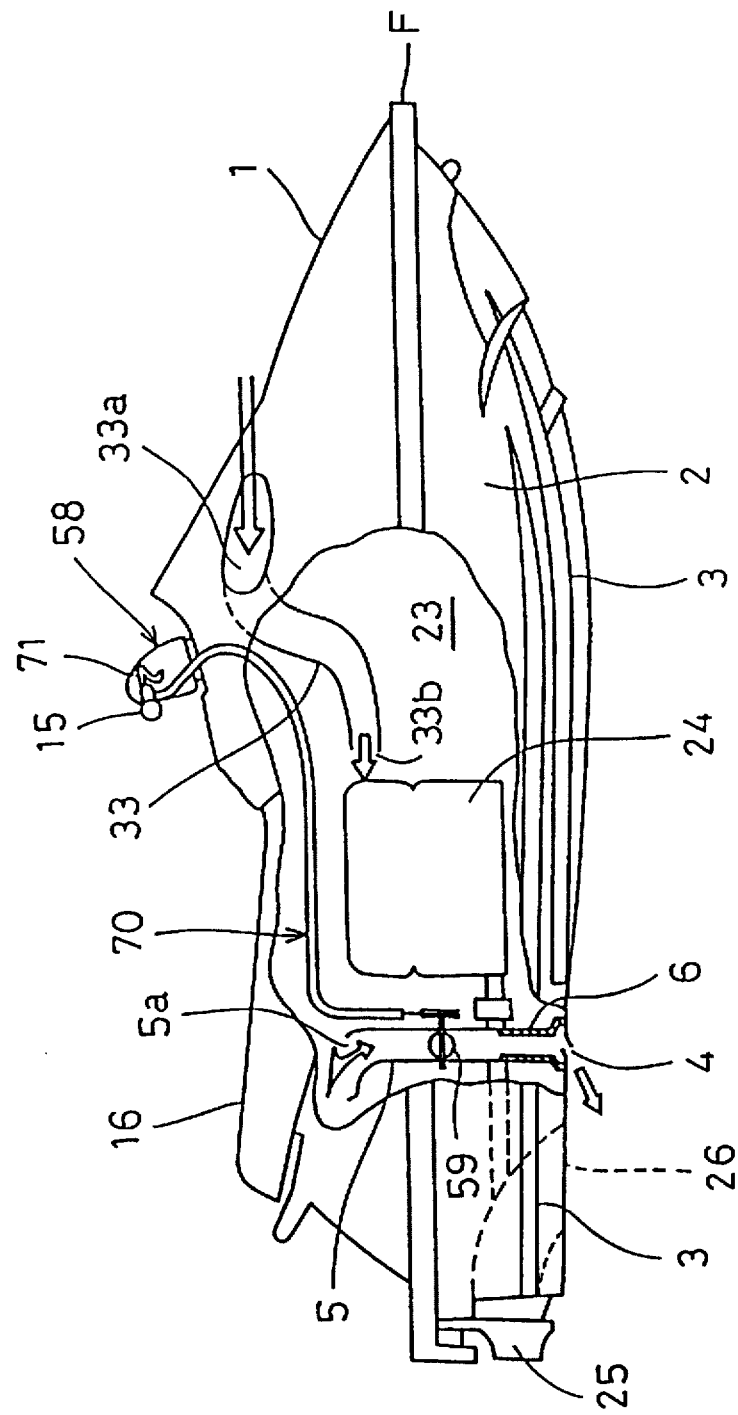
FIG. 29 is a side view of a small planing watercraft provided with a drag suppressing apparatus according to the thirteenth embodiment of the invention.
Figure 30:
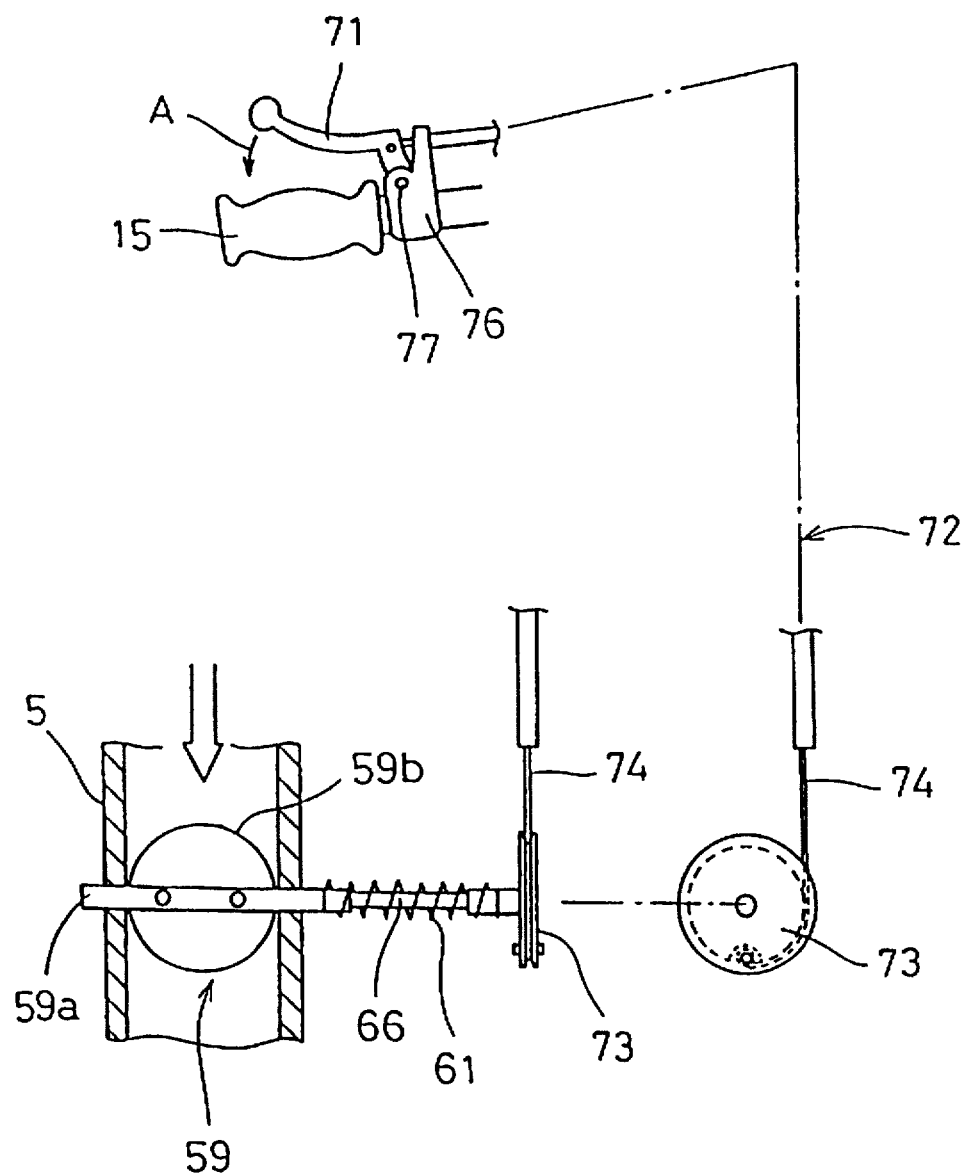
FIG. 30 is a side view showing valve control means and a control valve of the small planing watercraft.

FIG. 29 shows a side view of a small planing watercraft provided with a drag suppressing apparatus as the thirteenth embodiment of the invention. In this embodiment, the above mentioned valve driving means 60 is replaced with control means 70 for controlling the opening of the control valve 59, installed in the discharge duct 5 at a mid point thereof, by handle operation. The control means 70 comprises a valve control lever 71 installed near the steering handle 15 of the steering device 58 as shown in FIG. 29. FIG. 30 and a linkage mechanism 72 which is linked to the manual operation of the valve control lever 71 and controls the opening of the control valve 59.

The valve control lever 71 is supported rotatably via a support shaft 77 on a bracket 76 which is fixed on the handle 15. The linkage mechanism 72 comprises a driven rotor 73 rotatably linked to the support shaft 59a of the control valve 59 via the torsion spring 61 and a wire 74 which drives the driven rotor 73 to rotate in linkage with the valve control lever 71. Configurations of the driven rotor 73, linkage between the rotor 73 and the control valve 59 and other structures are similar to those in the twelfth embodiment.

In the case of the small planing watercraft of this configuration, when the valve control lever 71 of the control means 70 is moved in direction A during turning maneuver, the movement of the value control lever 71 is transmitted via the linkage mechanism 72 to the control valve 59 thereby to decrease the opening of the control valve 59 according to the amount of movement of the valve control lever 71. This causes the amount of air introduced into the discharge duct 5 and discharged from the discharge port 4 located at the bottom of the craft into water to decrease, thereby suppressing the decrease of the friction resistance on the bottom of the craft due to the discharged air, and suppressing the sideways skidding of the craft body during a turning maneuver.

It is the same as in the case of the twelfth embodiment that the friction resistance on the bottom of the craft is decreased by the air discharged from the discharge port 4 during straight running and it is made possible to increase the maximum craft speed and improve the acceleration performance.

Figure 31:
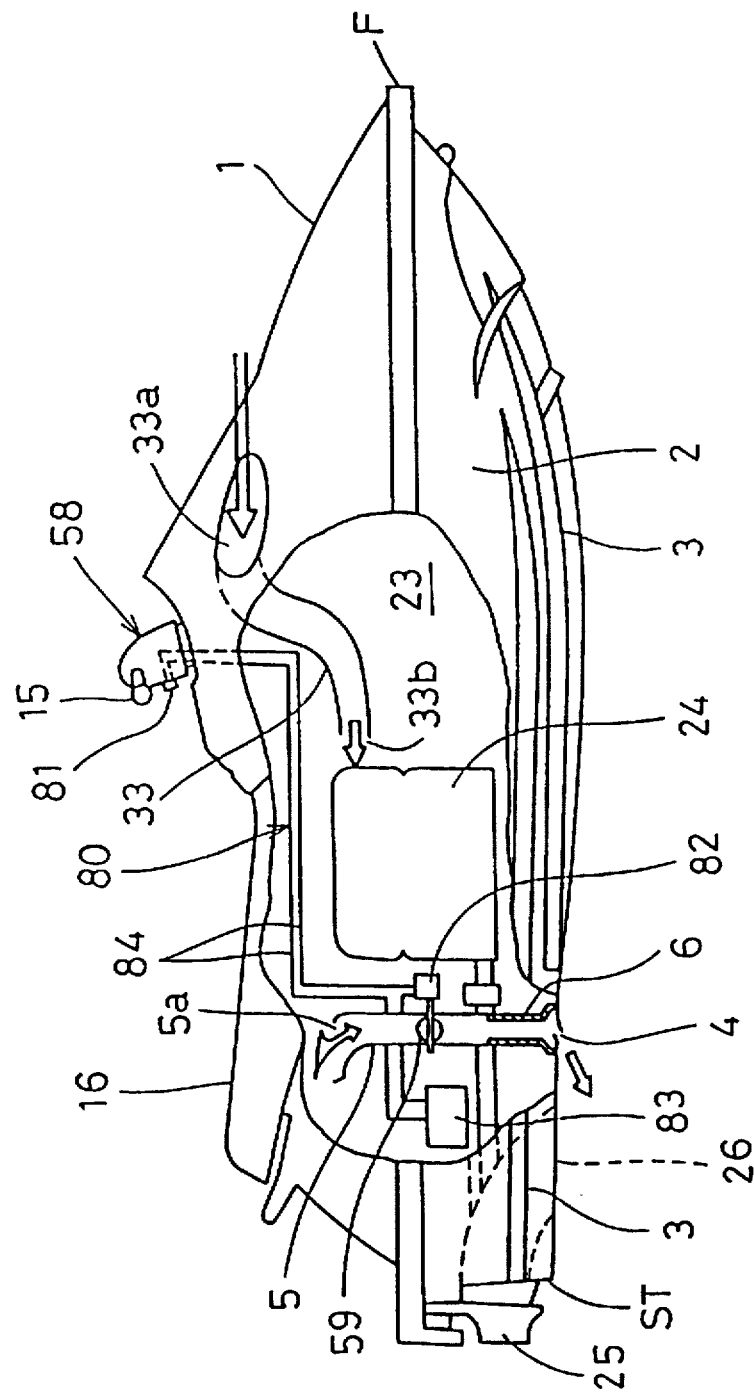
FIG. 31 is a side view of a small planing watercraft provided with the drag suppressing apparatus according to the fourteenth embodiment of the invention.
Figure 32:
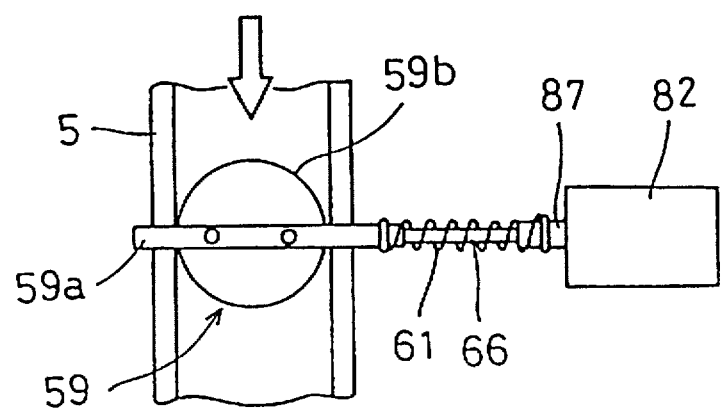
FIG. 32 is a partially cutaway front view showing the valve control means and the control valve of the small planing watercraft.

FIG. 31 shows a side view of a small planing watercraft provided with the drag suppressing apparatus as the fourteenth embodiment of the invention. In this embodiment, the control means 80 for controlling the opening of the control valve 59 is constituted from a valve control switch 81 installed in the portion of the steering device 58 and an electrically operated valve driving means 82 of which energization is controlled by the valve control switch 81 thereby to control the opening of the control valve 59. The valve control switch 81, the valve driving means 82 and a battery 83 are connected by wiring 84. The valve driving means 82 comprises, for example, an electromagnetic valve of ON/OFF type, and is powered by the battery 83 installed in the engine room 23. As shown in FIG. 32, a rotary actuation shaft 87 of the valve driving means 82 and the support shaft 59a of the control valve 59 are linked to each other via the torsion spring 61 and the rotary linkage 66.

In the case of the small planing watercraft of this configuration, when the valve control switch 81 which constitutes the control means 80 is manually operated to energize the valve driving means 82 during a turning maneuver, the control valve 59 fully closes. This causes the amount of air introduced into the discharge duct 5 and discharged from the discharge port 4 at the bottom of the craft into water to decrease or become zero, thereby suppressing the decrease of friction resistance on the bottom of the craft due to the discharged air, and suppressing the sideways skidding of the craft body during a turning maneuver.

It is the same as in the cases of the twelfth and thirteenth embodiments, that the maximum craft speed can be increased and acceleration performance can be improved during straight running.

Although the above embodiments are described in the case of discharging the inner air of the engine room 23 from the discharge port 4, such a configuration may also be employed as the downstream side end of the ram air duct 33 is extended to connect to the discharge duct 5 thereby to introduce air outside of the craft body, which is taken through the ram air duct 33, directly into the discharge duct 5 and discharging it from the discharge port 4. Alternatively, exhaust gas of the engine 24 may be introduced into the discharge duct 5 and discharged from the discharge port 4 into water. Further, such a configuration may be employed as the intake port 5a of the discharge duct 5 opens on a side face of the seat base 1a of the deck 1, as indicated by the alternate dot and dash line of FIG. 26, thereby to introduce air outside of the craft body into the discharge duct 5 and discharge it from the discharge port 4 into water.

The position of the discharge port 4 in the above embodiments may be located, for example, at behind the rear end 3a of the spray strip 3 near the center of the bottom of the craft shown in FIG. 13. In this case, negative pressure generated in the region behind the rear end 3a of the spray strip 3 can be reduced by the gas discharged from the discharge port 4 thereby to decrease the pressure resistance and the friction resistance. This causes maximum craft speed to increase and acceleration performance to improve effectively. Similar effects can be achieved, of course, by providing the discharge port behind the rear end of the spray strip, in case the rear end of the outer spray strip 3 is located forward from the stern ST.

As described above, according to the drag suppressing apparatus or the drag suppressing method for the small planing watercraft of one configuration of the invention, because air outside of the craft body is sucked into the craft and discharged into a space located behind the rear end of the strip by using a pressure drop in the space, it is made possible to sufficiently decrease the pressure resistance and the friction resistance behind the rear end of the strip, thereby to increase the maximum craft speed and improve the acceleration performance, without making the rear portion of the strip narrower and extending it.

According to the drag suppressing apparatus or the drag suppressing method for the small planing watercraft of another configuration of the invention, because air in the engine room is sucked in and discharged into a space located behind the rear end of the strip by using pressure drop in the space, it is made possible to sufficiently decrease the pressure resistance and the friction resistance behind the rear end of the strip, thereby to increase the maximum craft speed and improve the acceleration performance, without making the rear portion of the strip narrower and extending it, while the engine room can be ventilated at the same time.

According to the drag suppressing apparatus of one configuration of the invention, the discharge port is provided on the water contact surface of the bottom of the craft, and air outside of the craft body is taken in the discharge duct directed to the discharge port and discharged into water by the ram pressure during running of the craft body. Therefore, the friction resistance on the bottom of the craft deceases, since a layer of discharged air is formed between the bottom of the craft and the outside water stream. Thereby, the maximum craft speed is increased and the acceleration performance is improved.

According to the drag suppressing apparatus of another configuration of the invention, the discharge port for discharging air into water is provided on the bottom of the craft, in a region which forms a water contact surface, and air outside of the craft body is taken in and guided into the engine room by using ram pressure during running of the craft while air in the engine room is sucked and guided to the discharge port. Therefore, air outside of the craft is taken into the engine room by the ram pressure during running and air in the engine room is discharged into water. This causes the friction resistance at the bottom of the craft to decrease, thus making it possible to increase the maximum craft speed and improve the acceleration performance and ventilate the engine room.

Further according to the drag suppressing apparatus of another configuration of the invention, the discharge port located at a region of the bottom of the craft which forms a water contact surface for discharging air into water, the pump for sucking in air in the engine room or air outside of the craft body and the discharge duct for guiding the air delivered by the pump to the discharge port are provided. Therefore, the air in the engine room or the air outside of the craft body is sucked in and discharged from the discharge port located at the bottom of the craft, thereby decreasing the friction resistance at the bottom of the craft, thus making it possible to increase the maximum craft speed and improve the acceleration performance. In case the air in the engine room is discharged, the engine room can also be ventilated.

According to the drag suppressing apparatus of another configuration of the invention, the discharge port located at a region of the bottom of the craft which forms a water contact surface for discharging air into water and the discharge duct for guiding at least a part of exhaust gas from the engine to the discharge port are provided. Therefore, at least a part of exhaust gas from the engine is discharged from the discharge port located at the bottom wall of the craft into water and thereby friction resistance at the bottom of the craft decreases. In this way, one can increase the maximum craft speed and improve the acceleration performance.

According to the drag suppressing apparatus of one configuration of the invention, the discharge duct which is formed integrally with the bottom of the craft wall and opens in the bottom of the craft in a region which forms water contact surface while extending above the water line during the time when the craft is at standstill, and the cover which covers the aperture in the bottom of the craft and has the discharge port directed backward or obliquely backward from the bottom of the craft are provided so that fluid is passed through the discharge duct and is discharged from the discharge port into water. Therefore, fluid such as air, exhaust gas or bilge water can be discharged from any position in the bottom of the craft, making it possible to sufficiently decrease the pressure resistance and the friction resistance of the bottom of the craft and thereby increase the maximum craft speed and improve the acceleration performance. Also area around the discharge port is sealed against water and water does not enter in the craft even when the craft is at standstill as well as when the craft is running.

According to the drag suppressing apparatus or the drag suppressing method according to the invention, gas is discharged from the discharge port located at the bottom of the craft into water and the amount of discharged gas is decreased according to an increase in the movement of the steering device. Therefore, maximum craft speed can be increased and acceleration performance can be improved by discharging gas from the discharge port located at the bottom of the craft thereby reducing the friction resistance on the bottom of the craft during straight running, while the quantity of discharged gas decreases during a craft turning maneuver when the steering device is swung and therefore it is made possible to suppress the decrease in the friction resistance on the bottom of the craft and suppress sideways skidding of the craft.

According to the drag suppressing apparatus or the drag suppressing method according to another configuration of the invention, gas is discharged from the discharge port located at the bottom of the craft into water and the quantity of discharged gas is controlled by manual operation. Therefore, maximum craft speed can be increased and acceleration performance can be improved while suppressing the decrease of friction resistance on the bottom of the craft and suppressing sideways skidding by decreasing the quantity of discharged gas by manual operation during a craft turning maneuver.

What is claimed is:

1. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a strip installed on the hull bottom of the craft to protrude therefrom and continuously extend along the longitudinal direction of the craft body substantially from near the stern to near the bow of the watercraft hull, a discharge port installed on the hull bottom of the craft contiguous with the rear end of the strip to discharge air into water, and a discharge duct for taking in air from the outside of the craft body by using a pressure decrease in a space behind the rear end of the strip and directing the air to the discharge port.

2. The drag suppressing apparatus for the small planing watercraft of claim 1 wherein the discharge port opens substantially backward from the strip.

3. The drag suppressing apparatus for the small planing watercraft of claim 2 further, comprising a guide-out port installed on the bottom of the craft to guide the air to the outside of the bottom wall of the craft and a cover having substantially the same shape as the strip protruding from the hull with said cover forming the rear-end of the strip and guiding the air from the guide-out port to a strip rear-end aperture which opens backwards and forms the discharge port.

4. The drag suppressing apparatus for the small planing watercraft of claim 3 including a watercraft body deck having an upper side wall, wherein a respective aperture is formed in the bottom wall of the craft on each side of the craft centerline, and a guide-out duct is installed penetrating through each aperture to extend upward above the water line during the time when the craft is standstill, wherein said guide-out duct includes the guide-out port at the bottom of the craft and an air suction port connected to said guide-out duct installed at the upper side wall of the watercraft body deck.

5. The drag suppressing apparatus for the small planing watercraft of claim 1 wherein a portion of the hull bottom is formed as a double-bottomed cavity between the inner surface of the hull bottom and an inner wall having a foamed substance filling part of the double-bottomed cavity around an air passage provided by the discharge duct.

6. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a strip installed on the hull bottom of the craft to protrude therefrom and continuously extend along the longitudinal direction of the craft body substantially from near the stern to near the bow of the watercraft hull, a discharge port installed on the hull bottom of the craft contiguous with the rear end of the strip to discharge air into water, and a discharge duct for taking in air from an engine room by using a pressure decrease in the space behind the rear end of the strip and directing the air to the discharge port.

7. The drag suppressing apparatus for the small planing watercraft of claim 6 wherein the discharge port is displaced from the center line of the bottom of the craft to one side, and is connected to the discharge duct, said discharge duct rising upwardly toward the top of the watercraft, crossing to the other side of the craft and connecting to an intake port located at a position displaced from the center line in the engine room on the other side of the watercraft.

8. The drag suppressing apparatus for the small planing watercraft of claim 7 wherein a portion of the hull bottom is formed as a double-bottomed cavity between the inner surface of the hull bottom and an inner wall with a foamed substance filling part of the double-bottomed cavity around an air passage provided by the discharge duct.

9. The drag suppressing apparatus for the small planing watercraft of claim 6 wherein the discharge port opens substantially backward from the strip.

10. The drag suppressing apparatus for the small planing watercraft of claim 9 further, comprising a guide-out port installed on the bottom of the craft to guide the air to the outside of the bottom wall of the craft and a cover having substantially the same shape as the strip protruding from the hull with said cover forming the rear-end of the strip and guiding the air from the guide-out port to a strip rear-end aperture that opens backwards and forms the discharge port.

11. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a discharge port installed on a rearward portion of the bottom of the craft, in a region which forms a water-contact surface, to discharge air into water, a discharge duct for taking in air from the outside of the craft body by using ram pressure during running of the craft and directing the air to the discharge port, and an independently mountable and dismountable cover having an opening and installed at the hull bottom to substantially cover said discharge port except for said opening so that said opening forms said discharge port and said air is discharged backward from said discharge port through said cover.

12. The drag suppressing apparatus for the small planing watercraft of claim 11, wherein the independently mountable and dismountable cover has an upstream or forward edge which is concave to the exterior bottom of the craft's hull in the downward direction away from the hull underside such that the upstream or forward edge points downstream and backward at a small diagonal from the hull bottom; and the discharge port cover has a downstream or back edge which is convex to the exterior bottom of the craft's hull in the upward direction into the discharge port interior such that the downstream or back edge points upstream into the discharge port interior at a small diagonal from the hull bottom.

13. The drag suppressing apparatus for the small planing watercraft of claim 11, wherein a portion of the hull bottom is formed as a double-bottomed cavity between the inner surface of the hull bottom and an inner wall with a foamed substance filling part of the double-bottomed cavity around an air passage provided by the discharge duct.

14. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a discharge port installed on the bottom of the craft, in a region which forms a water-contact surface, to discharge air into water, an independently mountable and dismountable cover having an opening and installed at the hull bottom to substantially cover said discharge port except for said opening so that said opening forms said discharge port and said air is discharged backward from said discharge port through said cover, a ram air duct for taking in air from the outside of the craft body and directing the air into an engine room by using ram pressure during running of the craft and a discharge duct for taking in air from the engine room and directing the air to the discharge port.

15. The drag suppressing apparatus for the small planing watercraft of claim 14, wherein the discharge port is displaced from the center line of the bottom of the craft to one side, and is connected to the discharge duct, said discharge duct rises upwardly toward the top of the watercraft, crossing to the other side of the craft and connecting to an intake port located at a position displaced from the center line in the engine room on the other side of the watercraft.

16. The drag suppressing apparatus for the small planing watercraft of claim 14, wherein the discharge port cover has an upstream or forward edge which is concave to the exterior bottom of the craft's hull in the downward direction away from the hull underside such that the upstream or forward edge points downstream and backward at a small diagonal from the hull bottom; and the discharge port cover has a downstream or back edge which is convex to the exterior bottom of the craft's hull in the upward direction into the discharge port interior such that the downstream or back edge points upstream into the discharge port interior at a small diagonal from the hull bottom.

17. The drag suppressing apparatus for the small planing watercraft of claim 14, wherein a part of the discharge duct which directs the air to the discharge port is disposed in a portion of the hull bottom formed as a double-bottomed cavity between the inner surface of the hull bottom and an inner wall having a foamed substance filling part of the double-bottomed cavity around an air passage provided by the discharge duct.

18. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a discharge port installed on the bottom of the craft, in a region which forms a water-contact surface, to discharge air into water, a pump for sucking air from the outside of the craft body, a discharge duct which directs the air delivered by the pump to the discharge port, and an independently mountable and dismountable cover having an opening and installed at the hull bottom to substantially cover said discharge port except for said opening so that said opening forms said discharge port and said air is discharged backward from said discharge port through said cover.

19. The drag suppressing apparatus for the small planing watercraft of claim 18, wherein the discharge port cover has an upstream or forward edge which is concave to the exterior bottom of the craft's hull in the downward direction away from the hull underside such that the upstream or forward edge points downstream and backward at a small diagonal from the hull bottom; and the discharge port cover has a downstream or back edge which is convex to the exterior bottom of the craft's hull in the upward direction into the discharge port interior such that the downstream or back edge points upstream into the discharge port interior at a small diagonal from the hull bottom.

20. A drag suppressing apparatus for a small planing watercraft having an engine with exhaust gasses and having a hull bottom surface extending longitudinally from the stern to the bow of the watercraft hull and configured without a transverse surface step substantially dividing the hull bottom in a region of the hull bottom contacting the water during running operation of said watercraft, comprising a discharge port installed on the bottom of the craft, in a region which forms a water-contact surface, to discharge air into water, a discharge duct which directs at least a part of the exhaust gas from the engine to the discharge port, and an independently mountable and dismountable cover having an opening and installed at the hull bottom to substantially cover said discharge port except for said opening so that said opening forms said discharge port and said air is discharged backward from said discharge port through said cover.

21. The drag suppressing apparatus for the small planing watercraft of claim 20, wherein the discharge port cover has an upstream or forward edge which is concave to the exterior bottom of the craft's hull in the downward direction away from the hull underside such that the upstream or forward edge points downstream and backward at a small diagonal from the hull bottom; and the discharge port cover has a downstream or back edge which is convex to the exterior bottom of the craft's hull in the upward direction into the discharge port interior such that the downstream or back edge points upstream into the discharge port interior at a small diagonal from the hull bottom.

22. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a guide-out duct having a respective aperture opening at the bottom wall on each side of the watercraft centerline covered by a respective independently mountable and dismountable cover installed at the hull bottom to form a continuous substantially planar surface with the surrounding hull bottom of the craft, in a region which forms a water-contact surface, said guide-out duct being integrally formed with the bottom wall of the craft and extending upward above the water line at the time when the craft is standstill, said respective cover which covers an aperture in the bottom of the craft having a discharge port directed substantially backward on the bottom of the craft, whereby air is passed through the guide-out duct and discharged into water from the discharge port.

23. The drag suppressing apparatus for the small planing watercraft of claim 22, wherein an intake port of a discharge duct is located in an engine room to discharge air from the engine room through the discharge duct and the guide-out duct into water from the discharge port.

24. The drag suppressing apparatus for the small planing watercraft of claim 22, wherein an upstream side edge of the discharge port of the cover in the outside water stream is protruded more downward than the bottom of the craft wall such that said cover has an upstream or forward edge which is concave to the exterior bottom of the watercraft hull in the downward direction away from the hull underside such that the upstream or forward edge points downstream and backward at a small diagonal from the hull bottom, so that a negative pressure region is formed at the discharge port as the outside water stream velocity increases.

25. The drag suppressing apparatus for the small planing watercraft of claim 22, wherein a downstream side edge of the discharge port of the cover in the outside water stream is displaced above the upstream side edge of the discharge port in the outside water stream such that said cover has a downstream or back edge which is convex to the exterior bottom of the craft's hull in the upward direction into the discharge port interior such that the downstream or back edge points upstream into the discharge port interior at a small diagonal from the hull bottom, so that a negative pressure region is formed as the outside water stream separates.

26. The drag suppressing apparatus for the small planing watercraft of claim 22, wherein the craft body comprises a hull and a deck having a side wall which is bonded to the hull, the guide-out duct is formed integrally with the hull, and an intake duct installed at the side wall of the watercraft body deck, said watercraft body deck forming a seat, said intake duct connected to the guide-out duct and installed on the deck thereby to take in air from outside of the craft body and introduce it into the guide-out duct.

27. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a discharge port installed on the bottom of the craft, in a region which forms a water-contact surface, to discharge gas into water, a discharge duct for directing the gas into the discharge port, a control valve for controlling the flow rate of the gas through the discharge duct and a valve driving means acting in linkage with a steering device for driving the control valve so that the opening of the control valve decreases as the movement of the steering device increases regardless of which direction the steering device moves.

28. The drag suppressing apparatus for the small planing watercraft of claim 27, wherein the valve driving means comprises a rotor rotatably linked to a support shaft of the control valve via a torsion spring and a transmission means for driving the rotor to rotate in linkage with the steering device, such that the movement of the steering device in either direction causes the control valve opening to decrease.

29. A drag suppressing apparatus for a small planing watercraft having a hull bottom surface extending longitudinally from the stern to the bow of the watercraft hull and configured without a transverse surface step substantially dividing the hull bottom in a region of the hull bottom contacting the water during running operation of said watercraft, comprising a discharge port installed on the bottom of the craft, in a region which forms a water-contact surface, to discharge air into water, a pump for sucking air from the engine room, a discharge duct which directs the air delivered by the pump to the discharge port, and an independently mountable and dismountable discharge port cover having an opening and installed at the hull bottom to substantially cover said discharge port except for said opening so that said opening forms said discharge port and said air is discharged backward from said discharge port through said cover, said discharge port cover forming a continuous substantially planar surface with the surrounding hull bottom area.

30. The drag suppressing apparatus for the small planing watercraft of claim 29, wherein the discharge port is displaced from the center line of the bottom of the craft to one side, and is connected to the discharge duct which rises upwardly toward the top of the watercraft, crossing to the other side of the craft and connecting to an intake port located at a position displaced from the center line in the engine room on the other side of the watercraft.

31. The drag suppressing apparatus for the small planing watercraft of claim 29, wherein the discharge port cover has an upstream or forward edge which is concave to the exterior bottom of the craft's hull in the downward direction away from the hull underside such that the upstream or forward edge points downstream and backward at a small diagonal from the hull bottom; and the discharge port cover has a downstream or back edge which is convex to the exterior bottom of the craft's hull in the upward direction into the discharge port interior such that the downstream or back edge points upstream into the discharge port interior at a small diagonal from the hull bottom.

\* \* \* \* \*